(12) United States Patent  
Sakai et al.

(10) Patent No.: US 7,620,232 B2
(45) Date of Patent: Nov. 17, 2009

(54) METHOD AND APPARATUS FOR PATTERN INSPECTION

(75) Inventors: Kaoru Sakai, Yokohama (JP); Shunji Maeda, Yokohama (JP); Hidetoshi Nishiyama, Fujisawa (JP)

(73) Assignee: Hitachi High-Technologies Corporation, Tokyo (JP)

( * ) Notice: Subject to any disclaimer, the term of this patent is extended or adjusted under 35 U.S.C. 154(b) by 475 days.

(21) Appl. No.: 11/119,944

(22) Filed: May 3, 2005

(65) Prior Publication Data

US 2006/0002604 A1    Jan. 5, 2006

(30) Foreign Application Priority Data

May 7, 2004   (JP) .............................. 2004-138009

(51) Int. Cl.
    *G06K 9/00*   (2006.01)
(52) U.S. Cl. ..................................... 382/141
(58) Field of Classification Search ....... None
    See application file for complete search history.

(56) References Cited

U.S. PATENT DOCUMENTS

| | | | | |
|---|---|---|---|---|
| 4,589,140 A | * | 5/1986 | Bishop et al. | 382/148 |
| 4,614,430 A | * | 9/1986 | Hara et al. | 382/149 |
| 4,978,224 A | * | 12/1990 | Kishimoto et al. | 356/394 |
| 5,454,049 A | * | 9/1995 | Oki et al. | 382/172 |
| 5,801,965 A | * | 9/1998 | Takagi et al. | 702/35 |
| 6,259,827 B1 | * | 7/2001 | Nichani | 382/291 |
| 7,106,895 B1 | * | 9/2006 | Goldberg et al. | 382/144 |
| 7,263,216 B2 | * | 8/2007 | Shishido et al. | 382/149 |
| 2003/0165264 A1 | * | 9/2003 | Tanabe et al. | 382/141 |
| 2005/0271280 A1 | * | 12/2005 | Farmer et al. | 382/224 |

FOREIGN PATENT DOCUMENTS

JP          5-264467          10/1993

* cited by examiner

*Primary Examiner*—Matthew C Bella
*Assistant Examiner*—Alex Liew
(74) *Attorney, Agent, or Firm*—Antonelli, Terry, Stout & Kraus, LLP.

(57) ABSTRACT

According to the present invention, for a pattern inspection apparatus that compares images in corresponding areas of two patterns that are identical and that determines an unmatched portion between the images is a defect, a plurality of detection systems and a plurality of corresponding image comparison methods are provided. With this configuration, the affect of uneven brightnesses for a pattern that occurs due to differences in film thicknesses can be reduced, a highly sensitive pattern inspection can be performed, a variety of defects can be revealed, and the pattern inspection apparatus can be applied for processing performed within a wide range. Furthermore, the pattern inspection apparatus also includes a unit for converting the tone of image signals of comparison images for a plurality of different processing units, and when a difference in brightness occurs in the same pattern of the images, a defect can be correctly detected.

14 Claims, 30 Drawing Sheets

FIG.15A
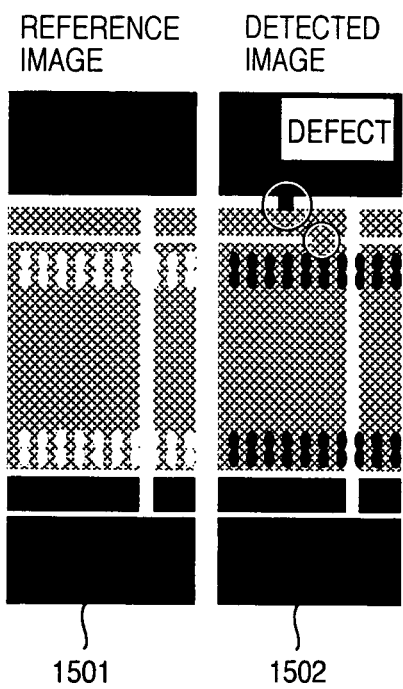
FIG.15B
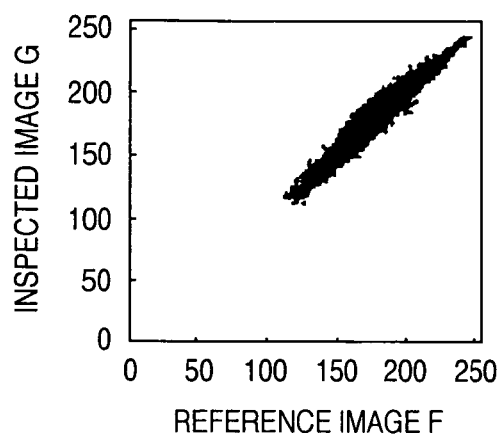
FIG.15C
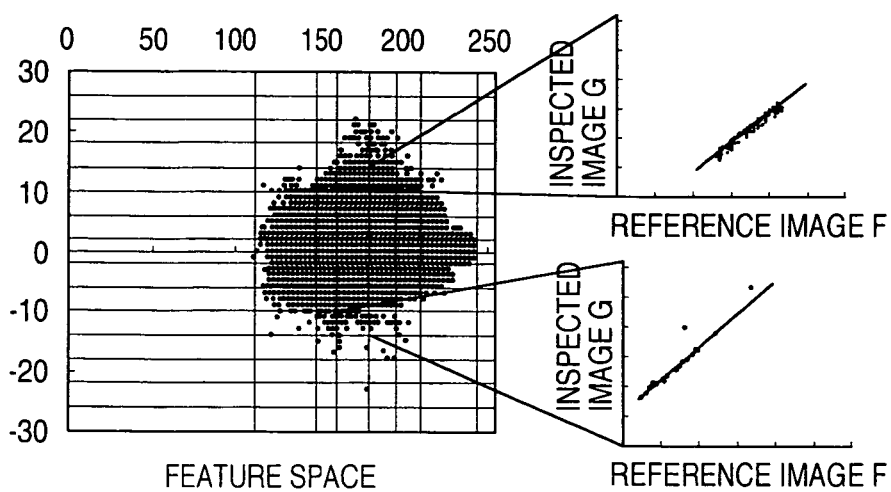
FIG.15D
FIG.15E

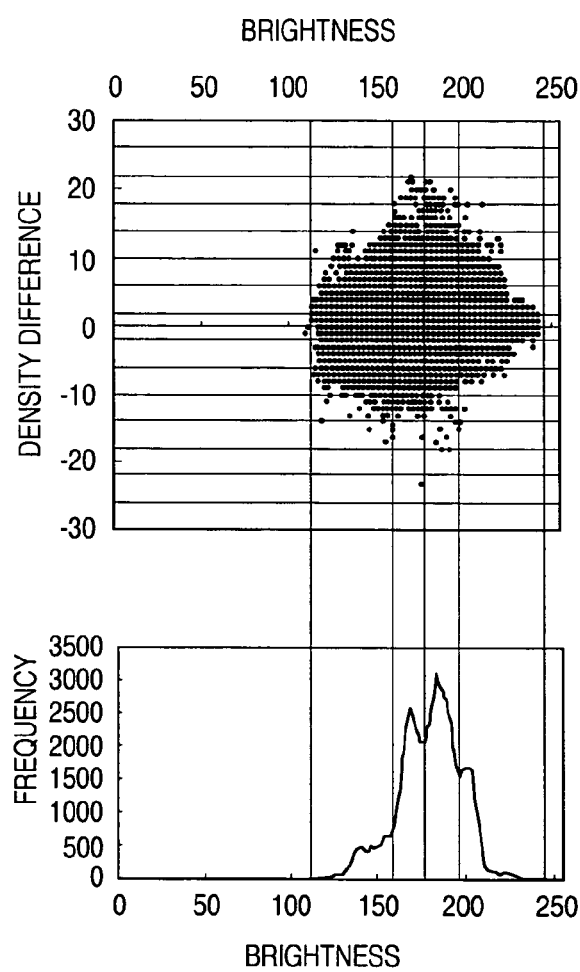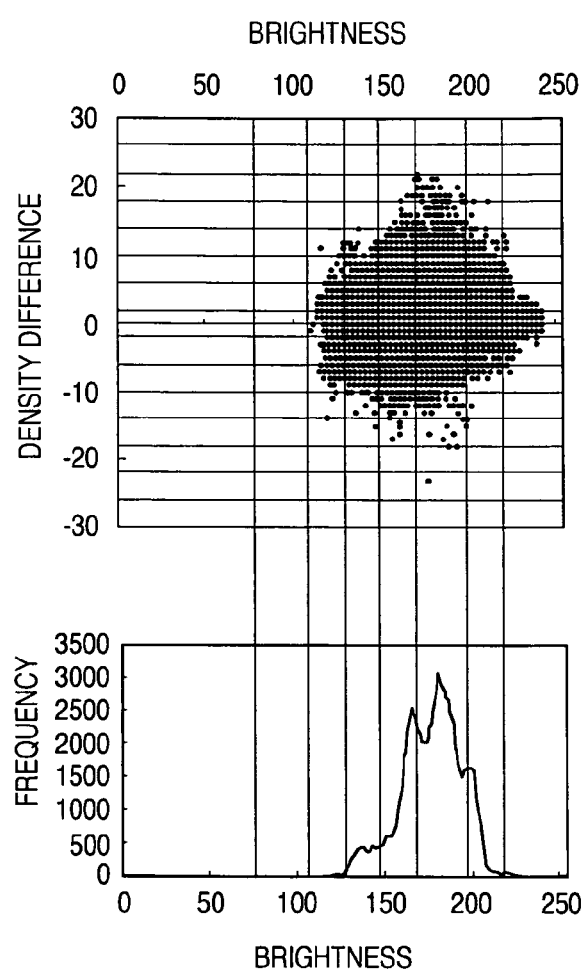
FIG.16A
FIG.16B

FIG.19A  FIG.19B  FIG.19C
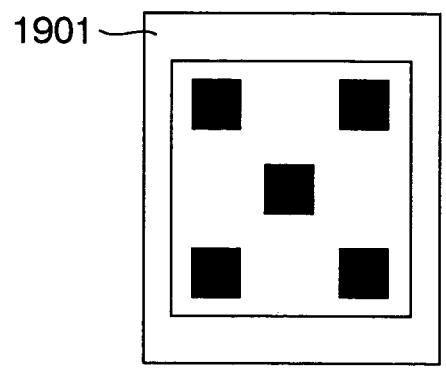
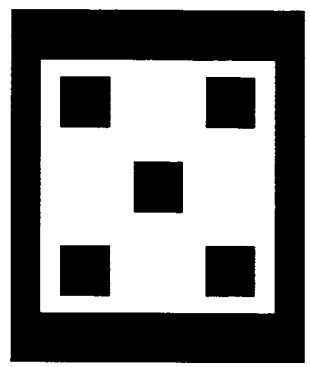
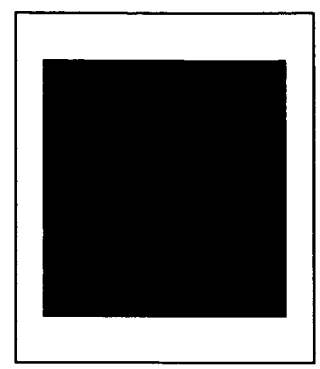
FIG.19D
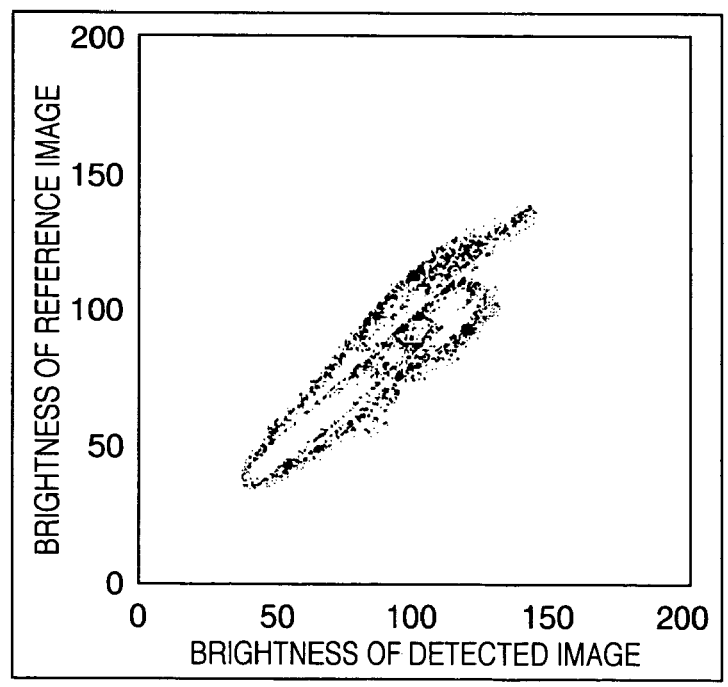

FIG.20A  FIG.20B  FIG.20C
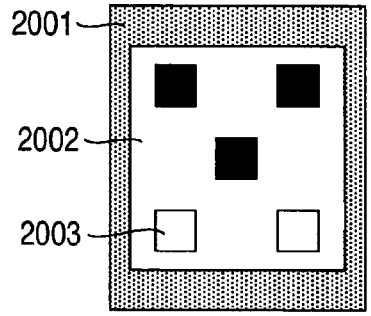
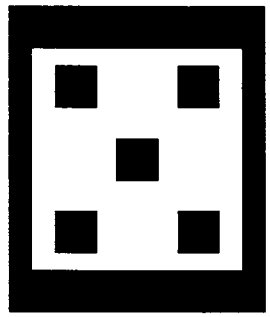
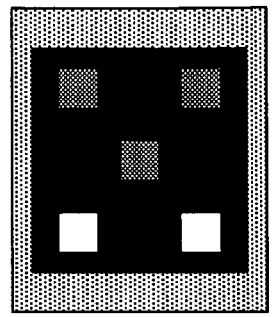
FIG.20D
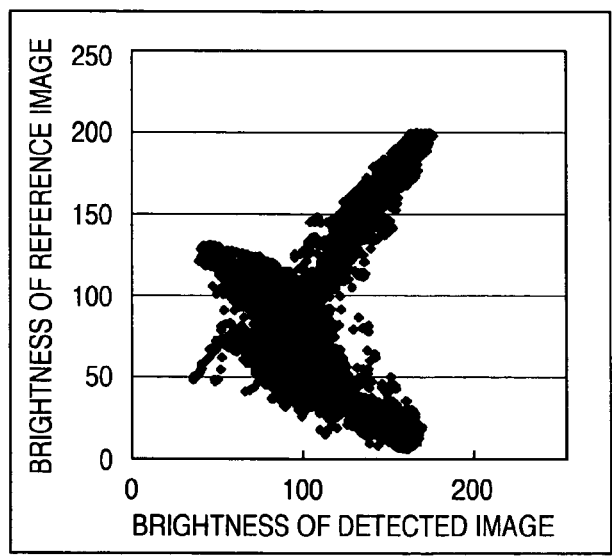
FIG.20E
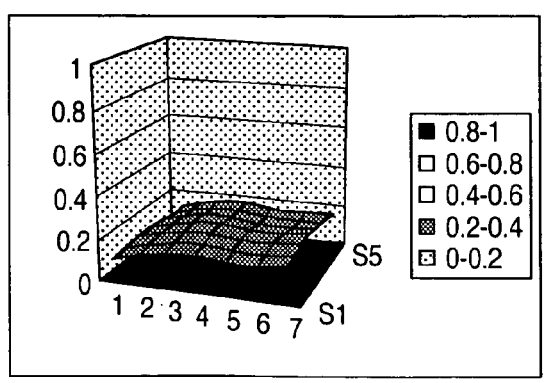

FIG.25A
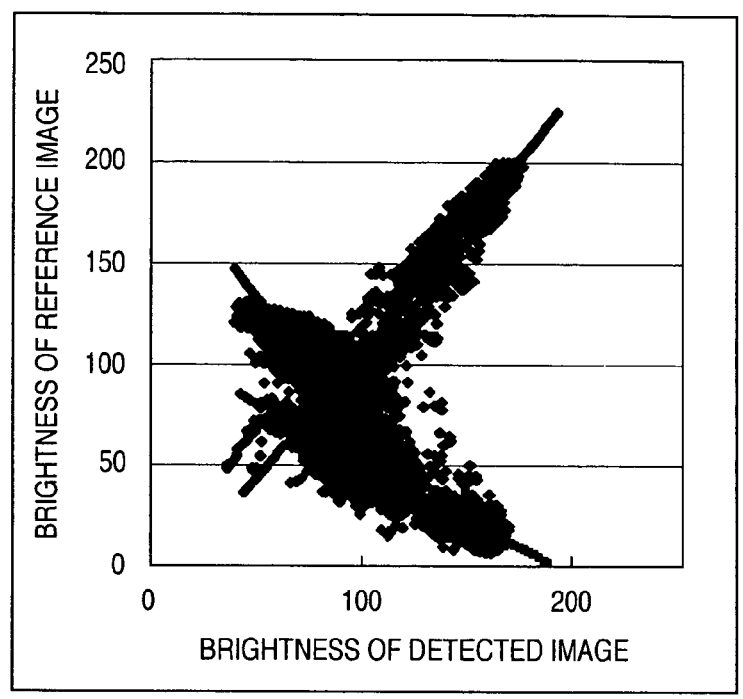
FIG.25B   FIG.25C   FIG.25D
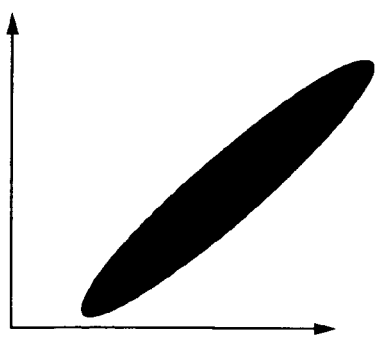 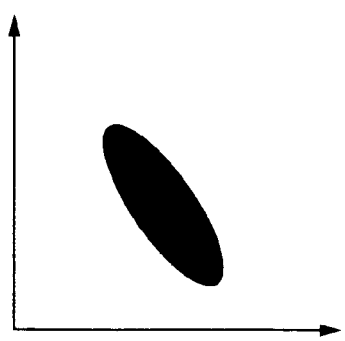 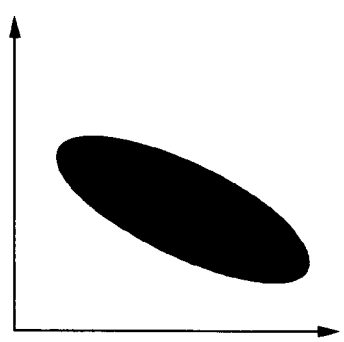

METHOD AND APPARATUS FOR PATTERN INSPECTION

INCORPORATION BY REFERENCE

The present application claims priority from Japanese application JP2004-138009 filed on May 7, 2004, the content of which is hereby incorporated by reference into this application.

BACKGROUND OF THE INVENTION

The present invention relates to pattern inspections according to which object images obtained using lights, or laser beams, are compared with reference images, and based on comparison differences, minute pattern defects or substances are found. The present invention particularly relates to a pattern inspection apparatus, and a method therefor, that is appropriate for conducting visual inspections of semiconductor wafers, TFTs and photomasks.

A method disclosed in JP-A-05-264467 is a known conventional technique for comparing an object image to be inspected with a reference image, and for detecting pattern defects.

According to this method, inspection samples wherein a repeated pattern is regularly arranged are sequentially scanned by a line sensor, and the obtained image is compared with an image obtained with a delay equivalent to the repeated pattern pitch. An unmatched portion is detected as a pattern defect. This conventional inspection method will be described while employing, as an example, the visual inspection of a semiconductor wafer. As is shown in FIG. 6, multiple chips having the same pattern are arranged in a semiconductor wafer to be inspected. Each of these chips can be roughly classified into a memory mat portion 71 and a peripheral circuit portion 72, as is shown in FIG. 7. The memory mat portion 71 is a set of small, repeated patterns (cells), while the peripheral circuit portion 72 is basically a set of random patterns. Generally, the memory mat portion 71 has a high pattern density, and a dark image is obtained by a bright-field illumination optical system. However, since the peripheral circuit portion 72 has a low pattern density, a bright image is obtained.

During a conventional visual inspection, images located at the same positions in the peripheral circuit portions 72 of adjacent chips, e.g., images in areas 61 and 62, etc., are compared, and a difference in the two is detected as a defect. At this time, since the two images are not always aligned, due to the vibration of a stage or the tilting of an object, a position shift distance is calculated between an image obtained by a sensor and an image that has been delayed by a time equivalent to a repeated pattern pitch. Registration of the two images is performed based on the obtained position shift distance, and a difference between the images is calculated. When the difference is greater than a predetermined value, this is determined to be a defect, or when the difference is smaller, this is determined to be a non-defect.

Generally in the registration of the two images during the comparison processing, the edges of the images are employed as a set of information for calculation of the position shift distance, and the position shift distance is calculated so that misalignment of the patterns in the images is minimized. Actually, a method for using normalized cross-correlation or a method using a residual sum is proposed.

SUMMARY OF THE INVENTION

Further, in a semiconductor wafer to be inspected, there are slight differences in the film thickness of the pattern due to the planarization produced, for example, by the CMP method, and for chips, the brightnesses of the images differ locally. For example, reference numeral 41 in FIG. 4A denotes an inspection image and reference numeral 42 in FIG. 4B denotes an example reference image, and as indicated by 4a and 4b in FIGS. 4A and 4B, the brightnesses of the inspection image and the reference image differ, even though the patterns are the same. Further, in FIG. 4A, there is a defect 4d in 41 in FIG. 4A for the inspection image. In this case, a differential image is as shown in FIG. 4C. The differential image is an image representing light and shade in accordance with a difference between the inspection image and the reference image at each position. The waveform of a difference at a position 1D-1D' is as shown in FIG. 4D. Since according to the conventional method a portion wherein the differential value is equal to or greater than a specified threshold value TH is regarded as a defect, a differential value 4c between the pattern 4a and the pattern 4b, which have different brightnesses, is detected as a defect. This should not, however, be detected as a defect, i.e., this is a false defect. Therefore, as a conventional method for avoiding the occurrence of a false defect, such as 4c in FIG. 4C, the threshold value TH is increased (TH in FIG. 4D→TH2). However, increasing the threshold value TH will reduce inspection sensitivity, and a defect 4d having a differential value equal to or less than the threshold value will not be detected.

Furthermore, there is a case wherein differences in brightness occur due merely to differences in the film thicknesses of specified chips in a chip array on a wafer shown in FIG. 6, or only in a specified pattern in a chip. If the threshold value TH is adjusted in consonance with these local areas, the overall inspection sensitivity would be considerably reduced.

In addition, when, as shown in FIG. 4, the difference in brightness due to the interference of a thin film is great in one part of the pattern, a correct position shift distance may not be obtained by using either a method employing the normalized cross-correlation or a method for calculating a residual sum.

On the other hand, there is a case wherein a defect can be revealed by a combination of factors, such as the material of an object, the surface roughness and the size or the depth, that depend on the object, and a factor, such as an illumination condition, that depends on a detection system.

The present invention resolves these conventional inspection technical problems and provides a pattern inspection method, for a pattern inspection apparatus that compares images in corresponding areas for two corresponding patterns and that determines that an unmatched image portion is a defect, whereby uneven brightnesses of the patterns that is caused by differences in film thicknesses is reduced and a highly sensitive pattern inspection can be conducted, and also provides a pattern inspection apparatus.

The present invention also provides a pattern inspection method, whereby a plurality of switchable detection system units (combinations of illumination optical systems and detection optical systems) are arranged, whereby a detection system (a combination of an illumination optical system and a detection optical system) is selected in accordance with an object or a target defect, and whereby the inspection is performed by a corresponding comparison and inspection method, so that a highly sensitive pattern inspection that can cope with a greater variety of defects can be attached, and a pattern inspection apparatus.

That is, according to the invention, a pattern inspection apparatus, which compares images in corresponding areas for two corresponding patterns and which determines that an unmatched image portion is a defect, comprises: a plurality of different switchable detection systems; a plurality of image comparison systems; and a plurality of defect categorizing systems that are consonant with the detection systems. When one or more detection systems are selected, the detection functions of the corresponding image comparison processing system and the defect categorization system should be taken into account. With this arrangement, an optimal condition can be selected, and a variety of types of defects can be detected.

A pattern inspection apparatus further comprises a unit for converting tones of image signals for compared images using a plurality of different processing units. With this arrangement, when an inspection object is a semiconductor wafer, and when the brightness differs in the same patterns of images due to a difference in the film thickness of the wafer, a fluctuation in the amount of illuminating light, discrepancies in pixels associated with the sensitivity of an image sensor, or uneven accumulated periods for the amount of light, a defect can be correctly detected.

Furthermore, a unit for sequentially adjusting position shifts of the compared images and brightness differences between the compared images, and a unit for adjusting the position shifts and the brightness shifts at the same time are provided. With this arrangement, when a great difference in brightness occurs, in a specific pattern, between images, due to a difference in the film thickness of the wafer, the position shift can be accurately detected. Furthermore, when a position shift occurs between images, the brightness difference can be accurately detected.

According to the present invention, since a plurality of image comparison processes and a plurality of categorizing processes corresponding to a plurality of detection systems are preformed, a highly sensitive inspection is ensured, and various defects can be detected.

In addition, brightnesses at different levels for images to be compared, which occur due to differences (uneven colors) in brightness between chips that are the results of various factors, such as differences between chips in film thicknesses, differences in the amount of light accumulated caused by variations in the speed of the stage, or fluctuations in illumination, are adjusted using a plurality of different methods. As a result, a defect for which a weak signal is hidden by strong, uneven brightness can become noticeable and can be detected.

Moreover, when the calculation of a position shift distance robust enough for uneven colors is performed, a more highly sensitive inspection can be made.

These and other objects, features and advantages of the invention will be apparent from the following more particular description of preferred embodiments of the invention, as illustrated in the accompanying drawings.

BRIEF DESCRIPTION OF THE DRAWINGS

FIG. 15A is a diagram showing a reference image and a detected image;

FIG. 15B is a scatter diagram for an entire image;

FIG. 15C is a graph showing a two-dimensional feature space;

FIG. 15D is a scatter diagram showing one segment obtained by dividing a feature space based on the scatter diagram for the entire space;

FIG. 15E is a scatter diagram showing one segment obtained by dividing a feature space based on the scatter diagram for the entire space;

FIG. 16A consists of graphs showing relationships between brightness, which represents an example segment division of a feature space, and a density difference and frequency;

FIG. 16B consists of graphs showing relationships between brightness, which represents an example segment division of a feature space, and a density difference and frequency;

FIGS. 19A, 19B and 19C are diagrams showing a detected image, a reference image and a differential image;

FIG. 19D is a scatter diagram for a detected image and a reference image;

FIG. 20A is a diagram showing a detected image wherein uneven brightnesses exist;

FIGS. 20B and 20C are diagrams showing a reference image and a differential image;

FIG. 20D is a scatter diagram for a detected image and a reference image;

FIG. 20E is a diagram showing a correlation between FIG. 20A and FIG. 20B;

FIG. 25A is a scatter diagram for brightnesses of a detected image and a reference image;

FIG. 25B is a graph showing positive correlation distribution data obtained by Hough conversion of the scatter diagram;

FIG. 25C is a graph showing the first negative correlation distribution data obtained by Hough conversion of the scatter diagram;

FIG. 25D is a graph showing the second negative correlation distribution data obtained by Hough conversion of the scatter diagram;

Figure 28:
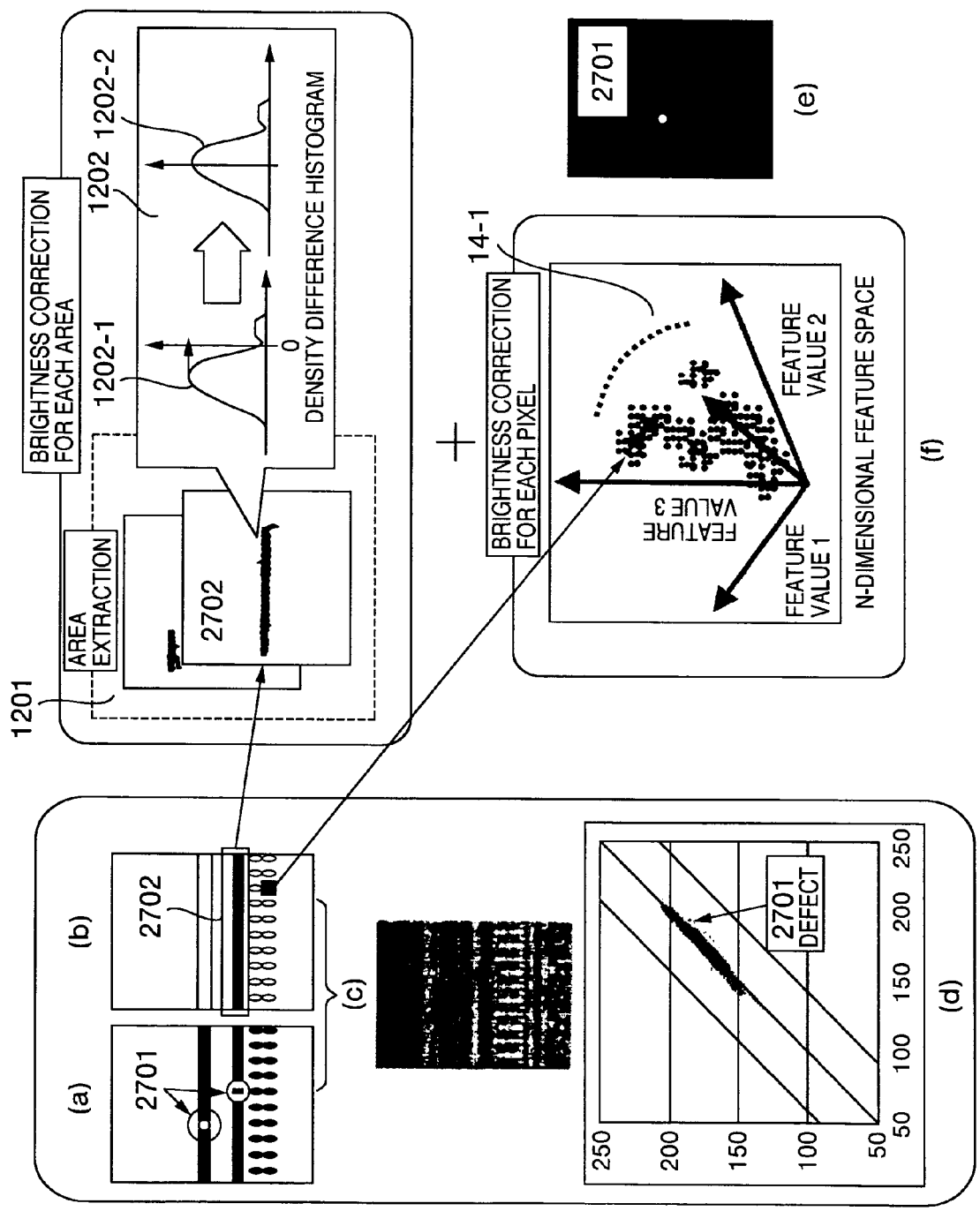
Figure 29A:
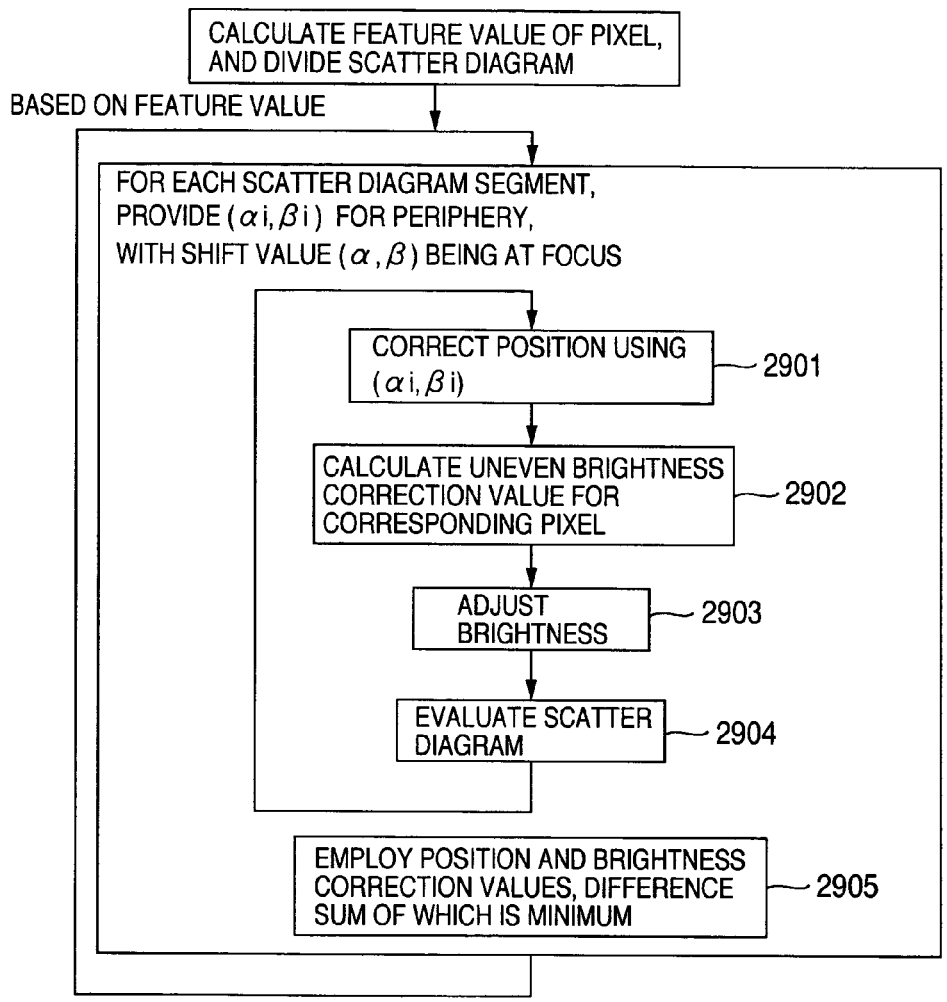
Figure 29B:
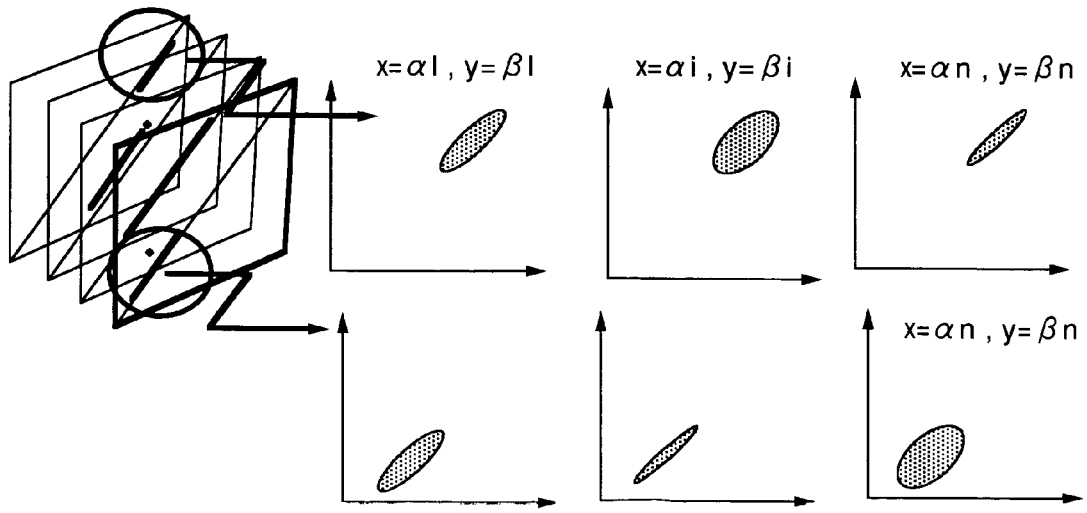
Figure 30:
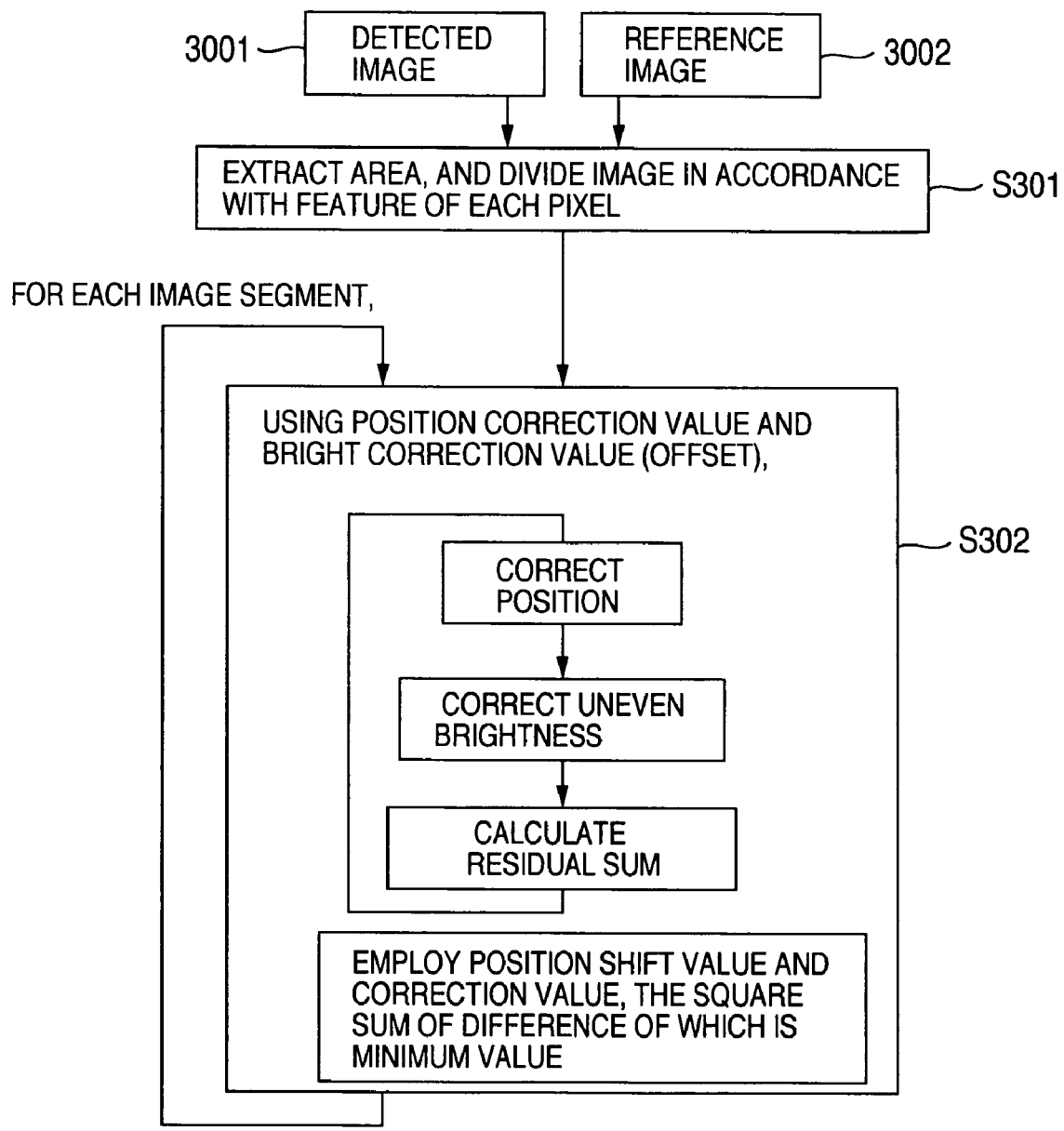
Figure 31:
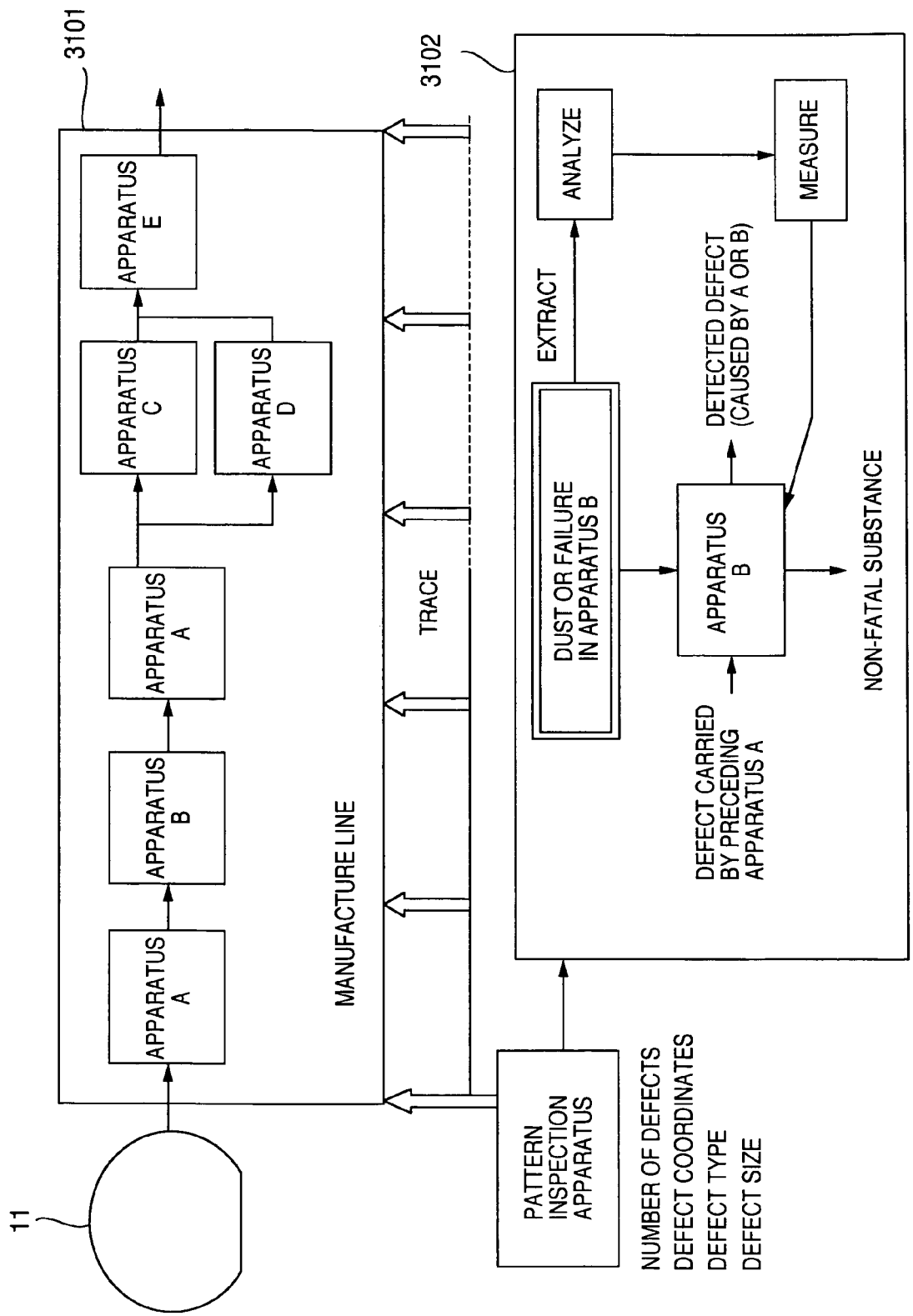
Figure 32:
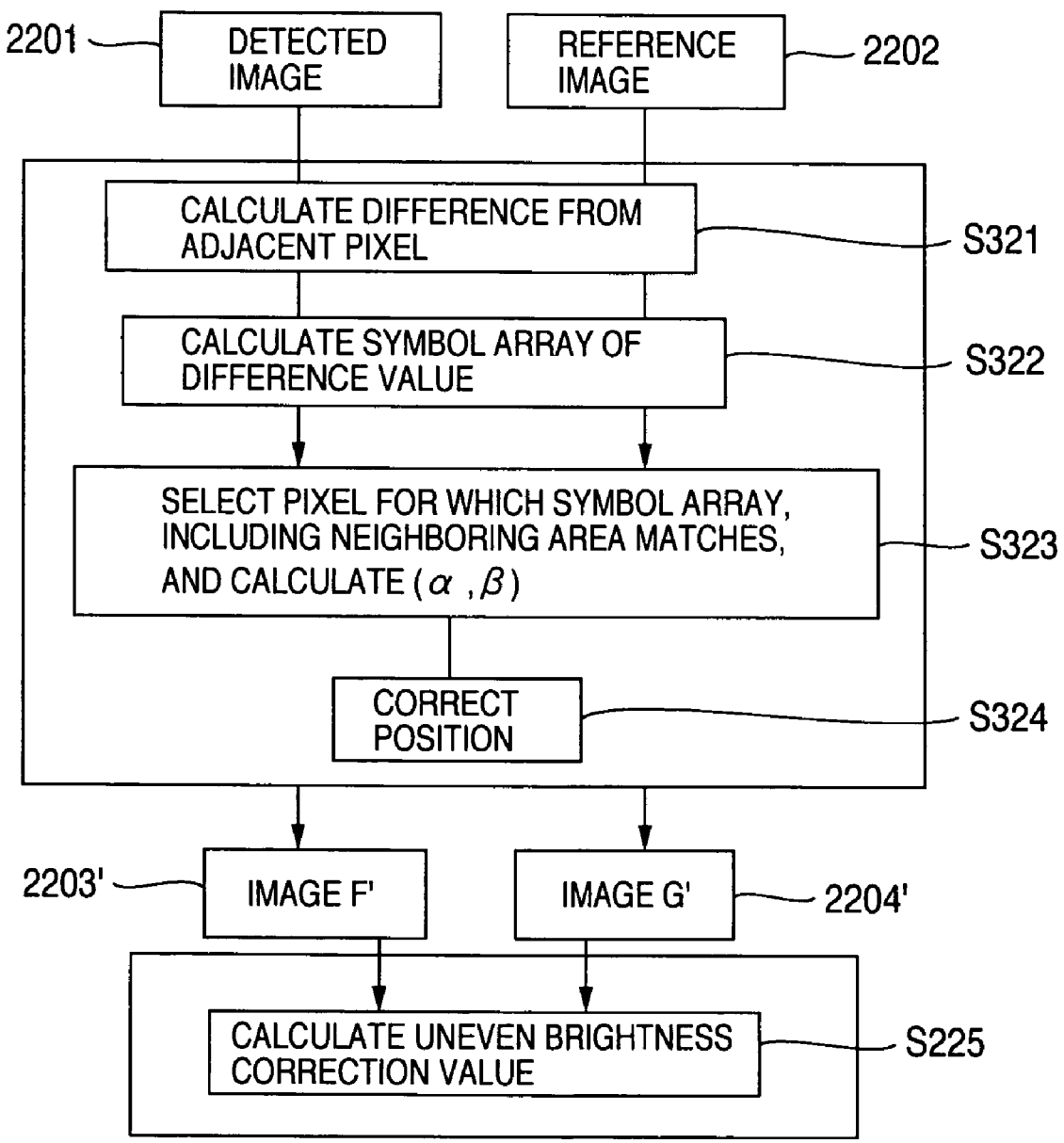
Figure 33:
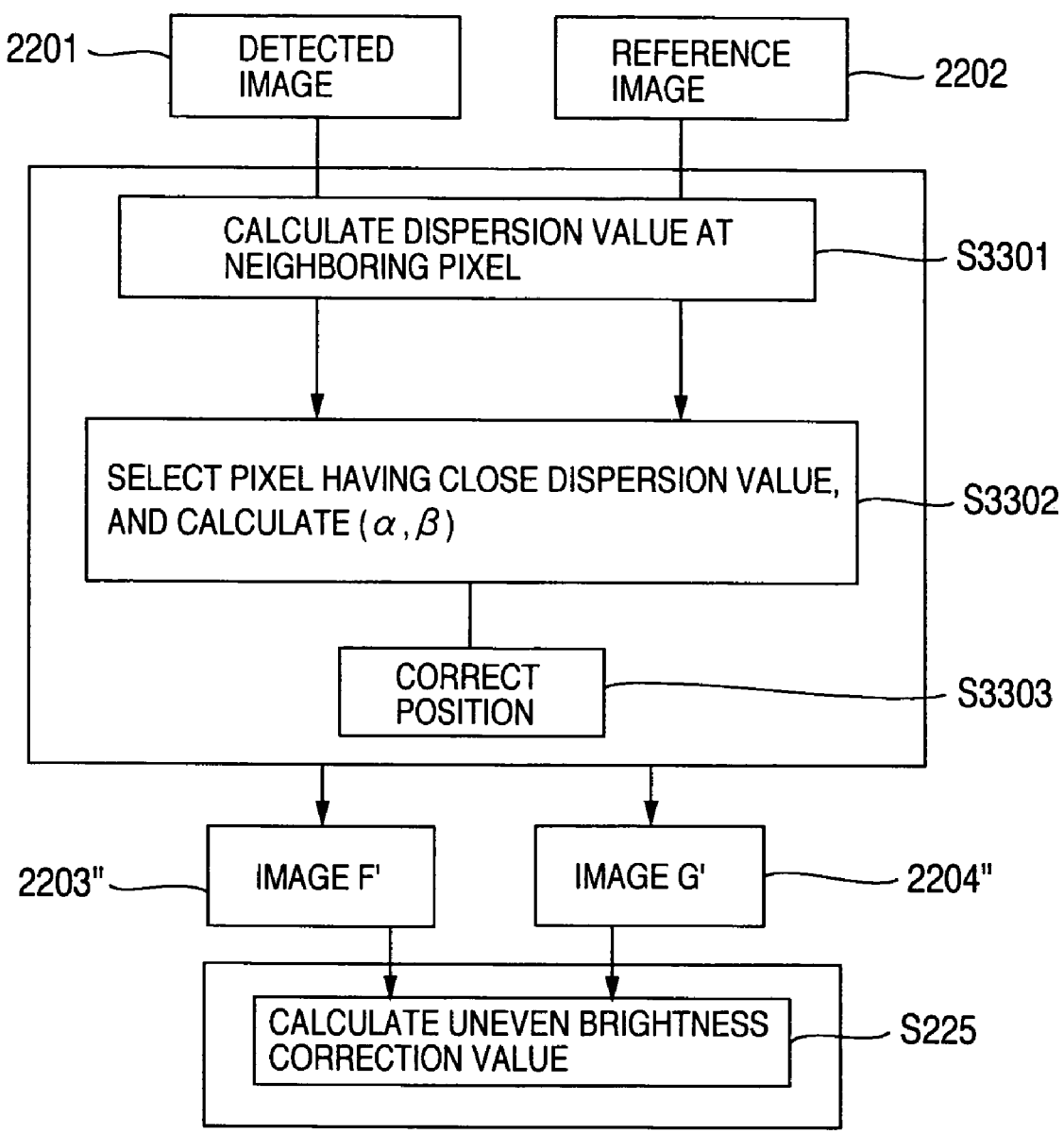

(a), (b) and (c) in FIG. 28 are a detected image, a reference image and a differential image;

(d) in FIG. 28 is a scatter diagram for the detected image and the reference image;

(e) in FIG. 28 is a differential image;

(f) in FIG. 28 is a diagram showing correction of brightness for each area and correction of brightness for each pixel;

FIGS. 29A and 29B are diagrams showing example registration and brightness correction processing relative to large uneven brightnesses;

FIG. 30 is a flowchart showing example registration and brightness correction processing relative to large uneven brightnesses;

FIG. 31 is a block diagram showing a semiconductor manufacturing system according to the present invention;

FIG. 32 is a flowchart showing example registration and brightness correction processing relative to large uneven brightnesses; and FIG. 33 is a flowchart showing example registration and brightness correction processing relative to large uneven brightnesses.

DESCRIPTION OF THE EMBODIMENTS

One embodiment of the present invention will now be described in detail while referring to FIGS. 1 to 33.

Figure 1:
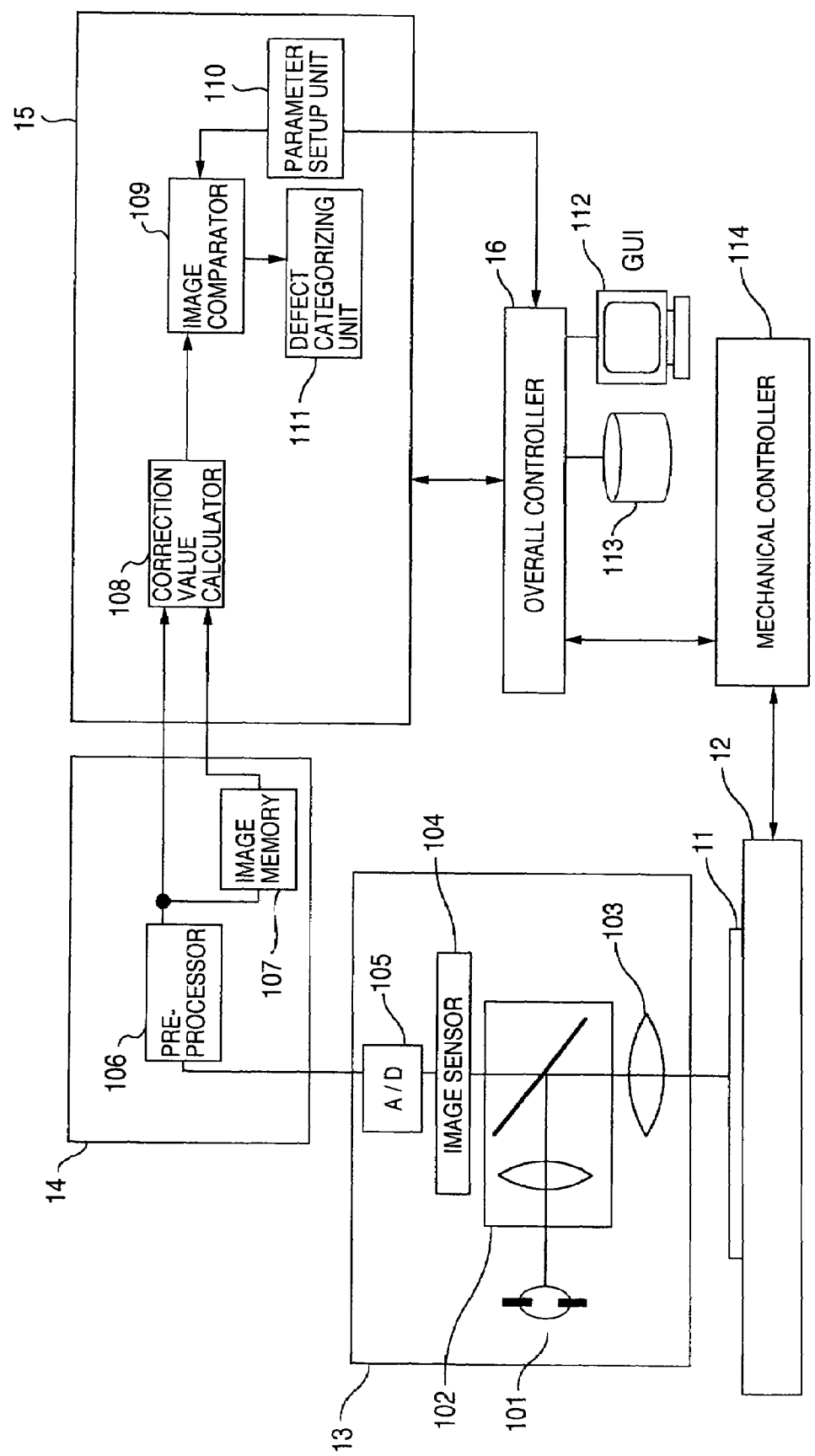
FIG. 1 is a block diagram showing an example configuration for an inspection apparatus.

For the embodiment, a defect inspection method for an optical visual inspection apparatus using a semiconductor wafer as an object is employed as an example. An example configuration for the optical visual inspection apparatus is shown in FIG. 1. Reference numeral 11 denotes a sample (an object to be inspected, such as a semiconductor wafer); 12, a stage on which the sample is mounted and moved; and 13, a detector.

The detector 13 includes: a light source 101, for irradiating the sample 11; an illumination optical system 102, for condensing light emitted by the light source 101; an object lens 103, for irradiating the sample 11 with illuminating light condensed by the illumination optical system 102 and for forming an optical image by focusing the light reflected by the sample 11; an image sensor 104, for receiving the optical image and for changing the optical image into an image signal consonant with the brightness; and an AD converter 105, for converting a signal received from the image sensor 104 into a digital signal.

In the example shown in FIG. 1, a lamp is employed as the light source 101; however, a laser may also be employed. Further, light emitted by the light source 101 may be either light having a short wavelength or light for which the wavelength range lies within a large bandwidth (white light). As shortwave light, light having a wavelength in the ultraviolet range, i.e., ultraviolet light (UV light), can also be employed in order to increase the resolution of an image to be detected (for detecting a minute defect). When a shortwave laser is employed as a light source, a unit (not shown) for reducing coherence should be provided.

A time delay integration image sensor (TDI sensor), wherein a plurality of one-dimensional image sensors are arranged two-dimensionally, can be employed as the image sensor 104. In synchronization with the movement of the stage 13, signals detected by the individual one-dimensional image sensors are transmitted to the one-dimensional image sensors at the following step and are added together, so that comparatively fast and highly sensitive detection is enabled.

Reference numeral 14 denotes an image editing unit 14, which includes: a pre-processor 106, for performing image correction, such as shading correction or dark level correction, for an digital image signal obtained by the detector 13; and an image memory 107, in which the corrected digital image signal is stored.

Reference numeral 15 denotes an image comparator for calculating defect candidates in a wafer serving as a sample. The image comparator 15 compares two images (a detected image and a reference image) stored in the image memory 107 of the image editing unit 14, and determines that a portion whose difference is greater than a threshold value is a defect. First, the image comparator 15 reads digital signals for a detected signal and a reference signal stored in the image memory 107; a correction value calculator 108 calculates correction values for correcting a position and brightness; and an image comparator 109 employs the obtained correction values for the position and the brightness to compare the brightnesses of the detected image and the reference image at the corresponding position and outputs as defect candidates portions for which the differential value is greater than a specific threshold value. A parameter setup unit 110 sets up an image processing parameter, such as a threshold value for extracting a defect candidate from a differential value, and transmits this parameter to the image comparator 109. Then, a defect categorizing unit 111 extracts a true defect, based on the feature values of the individual defect candidates, and categorizes the defect.

Reference numeral 16 denotes an overall controller that includes a user interface 112, which includes an input unit that accepts a change for an inspection parameter (e.g., a threshold value used for image comparison) entered by a user and a display unit for displaying detected defect information, a storage device 113, in which the feature values of detected defect candidates and images are stored, and a CPU (incorporated in the overall controller 160), for performing various control processes. Reference numeral 114 denotes a mechanical controller that drives the stage 12 based on control instructions issued by the overall controller 16. The image comparator 15 and the detector 13 are also driven in accordance with instructions issued by the overall controller 16.

Figure 6:
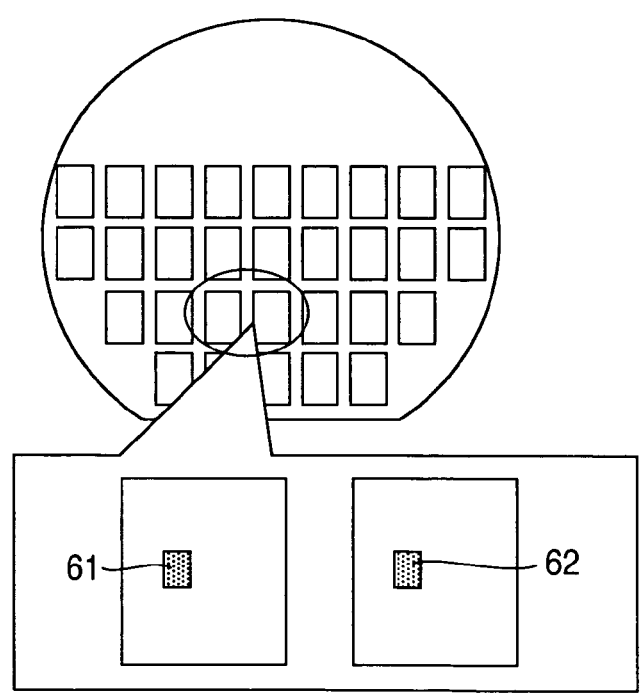
FIG. 6 is a plan view of a semiconductor wafer that is an array of chips to be inspected.
Figure 7:
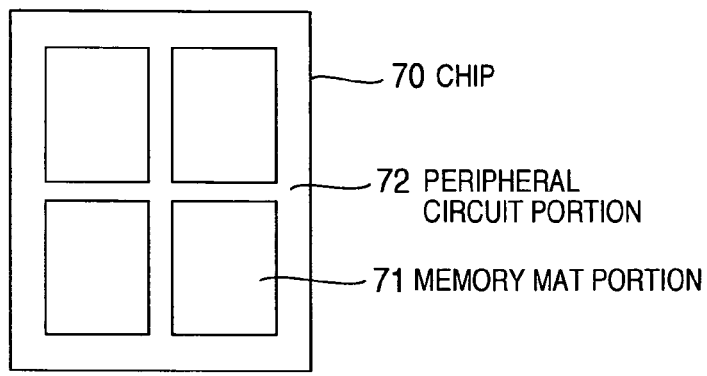
FIG. 7 is a plan view of an example structure for a chip.
Figure 8:
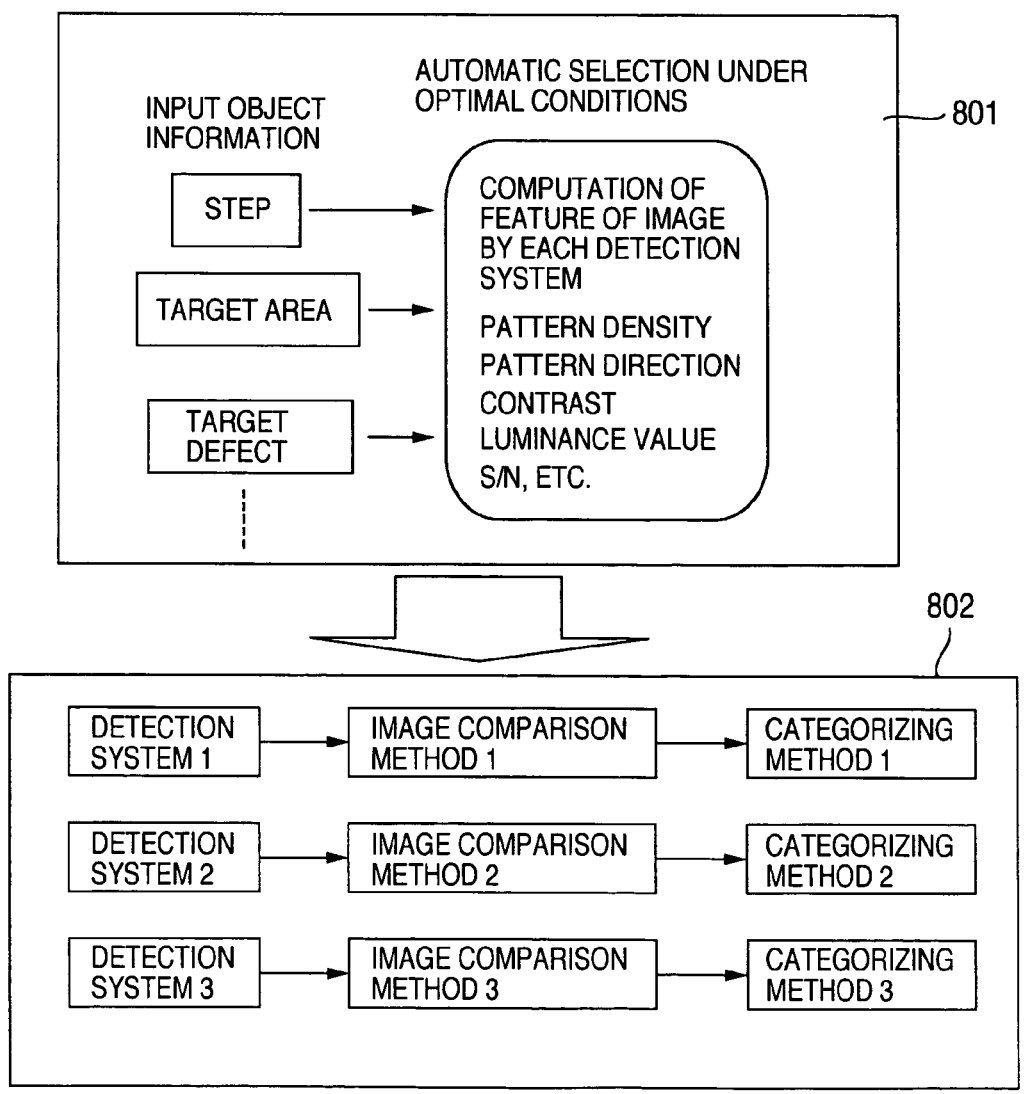
FIG. 8 is a diagram showing a method for selecting a detection system and a comparison method.

In a semiconductor wafer 11 to be inspected, multiple chips having the same pattern are arranged regularly, as shown in FIG. 6. According to the inspection apparatus in FIG. 1, the overall controller 16 sequentially moves the semiconductor wafer 11, which is a sample mounted on the stage 12, and in synchronization with this movement, fetches images of the chips from the detector 13. Then, while employing the above described procedures, the overall controller 16 compares the images detected at the same positions for two adjacent chips, e.g., compares the digital image signals for areas 61 and 62 in FIG. 6, which are regarded as a detected image and a reference image, and detects a defect.

Figure 2:
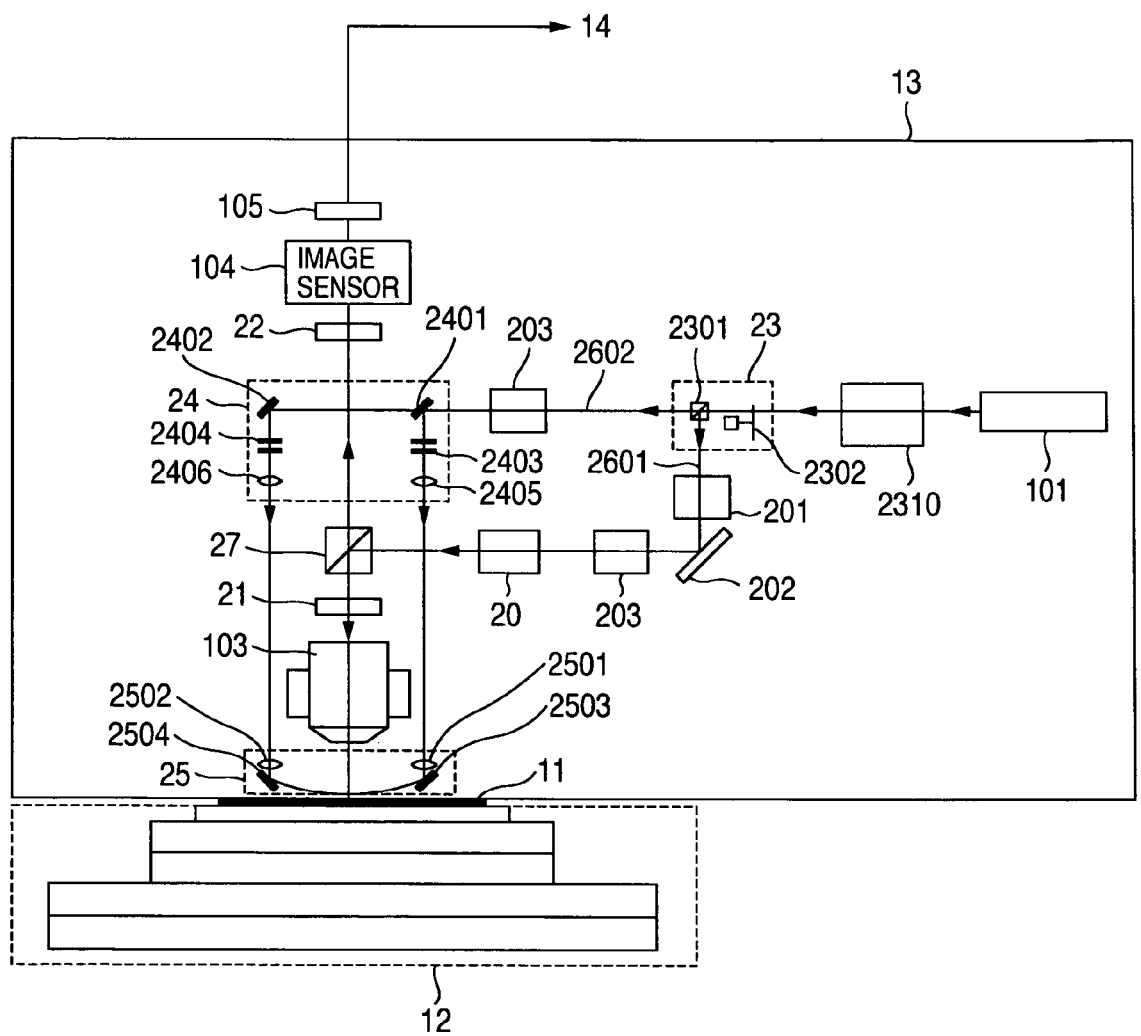
FIG. 2 is a front view of an example inspection apparatus including a plurality of illumination systems.

The detector 13 of the inspection apparatus for this embodiment includes a plurality of switchable detection systems. The detailed arrangement of the detector 13 is shown in FIG. 2.

Light emitted by the light source 101 passes through an artificial continuation optical system 3210, and enters a light path branching optical system 23, while the amount of light is averaged or substantially smoothed along the time axis. The light source 101 is a laser, and light emitted is ultraviolet light (UV light, or deep ultraviolet light (DUV light)), or visible light. The polarization of light incident to the light path branching optical system 23 is then adjusted by a polarization unit 2302, and thereafter, light is branched, by a polarized beam splitter 2301, into two light paths 2601 and 2602. The polarization unit 2302 is formed, for example, of a rotatable ½ wave plate, and the ratio of the amount of P polarized light to the amount of S polarized light to be transmitted can be adjusted within a range of from 1:0 to 0:1 in accordance with the rotation angle of the ½ wave plate. Light branched to the light path 2601 enters a beam formation optical system 201, wherein the diameter of the beam and the illuminance distribution are adjusted. Then, while the light path is bent by a mirror 202, light enters a coherent reduction optical system 203, wherein time and spatial coherences are reduced. The illuminating light from the coherence reduction optical system 203 is transmitted to a modified illumination optical system 20, whereat the illuminance distribution at the pupil position of the object lens 10 is changed, and irradiates the wafer 11 through a light modulation unit 21 and the object lens 103. In the following explanation, the illumination using light transmitted along the above described light path, i.e., the illumination through the object lens 103, is called bright-field illumination.

When the modified illumination optical system 20 is used to change the illuminance distribution of the light at the pupil position of the object lens 103 to a plurality of types, illumination using light that is branched to the light path 2601 in the above described manner can be performed to cope with the handling of wafers using a variety of processes. The modified illumination optical system 20 can, for example, be a filter for which light transmittance is changed in the light axial cross section, or an optical device that forms four luminous fluxes or eight luminous fluxes with point symmetry at a light axis. Further, a device that can move a beam may be employed to change the position of the beam. A device that can be used for moving the beam is a galvano mirror, for example, or a semiconductor resonance mirror. The modified illumination optical system 20 is so designed that it can switch these mirrors.

Light that is branched to the light path 2602 by the beam splitter 2301 passes through the interference reduction optical system 203 and enters, thereafter, a polarized light dark-field illumination optical system A24. The light is then branched by a partial mirror 2401 to provide two light paths. Light transmitted along one path passes through optical devices 2403 and 2405 and enters a polarization dark-field illumination optical system B25, while light transmitted along the other path is reflected by a full reflection mirror 2402 and passes through the optical devices 2403 and 2405 and enters the polarization dark-field illumination optical system B25. Light incident to the polarization dark-field illumination optical system B25 passes through optical device 2501 or 2502 and is reflected by a mirror 2503 or 2504. Thereafter, it is emitted obliquely, onto the surface of the wafer 11.

Of the reflected light that passes along the light path 2601 or 2602 and is emitted onto the wafer 11, light condensed by the object lens 103 passes through the light modulation unit 21, the polarized beam splitter 27 and the light modulation unit 22, and is focused on the detection face of the image sensor 104. The image sensor 104 detects the optical image that is thus formed and the A/D converter 105 converts the detection signal output by the image sensor 104 to obtain a digital signal that the detector 14 outputs. At this time, the image sensor 104 outputs, in parallel, a plurality of detection signals, and the A/D converter 105 performs the parallel A/D conversion of the detection signals and the parallel output of digital signals.

The light modulation unit 21 controls the illumination provided by the light that is branched to the light path 2601, and the amount of light reflected by the wafer 11 and the phase of the reflected light. For example, the light modulation unit 21 either adjusts the ratio of the amount of zero-order diffraction light reflected by the wafer 11 in accordance with the amount of high-order diffraction light or employs polarization differential interference, so as to improve the contrast for a circuit pattern signal detected by the image sensor 104. In this case, for the adjustment of the ratio of the zero-order diffraction light and the high-order diffraction light, a ½ wave plate and a ¼ wave plate must be combined to change the vibration direction of light. For the polarization differential interference, only a birefringence prism need be provided. A physical phenomenon produced by a polarization differential interference optical system that employs one Nomarski prism is the same as that for the common differential interference microscope. These components can also be employed by switching.

When the above described light modulation unit 22 is arranged at a location equivalent to the pupil position of the object lens 103, optical modulation at the pupil position is enabled. For example, a material on which a dielectric film is deposited is placed in the center of a transparent substrate, such as one composed of a vitreous silica, and light detected by the image sensor 104 is changed by altering the transmittance at the dielectric film portion. Instead of the dielectric film, a unit shielded by metal, for example, may be employed. Also For this unit, the above described wavelength plates and the birefringence prism can be switched.

Furthermore, the polarized light dark-field illumination optical system 24 and the polarized light dark-field illumination optical system 25 emit illuminating light onto the wafer 11 from outside the object lens 103. Along the light path 2602 in the polarized light dark-field illumination optical system 24, a partial mirror 2401 for providing light paths and a full reflection mirror 2402 are arranged. Whereas, illuminating light that is branched to the light path 2601 by the light path branching optical system 23, i.e., illuminating light passed through the object lens 103 is called bright-field illuminating light.

Since the light modulation unit and the function that performs, for example, the modified illumination and the dark-field illumination at the same time as the bright-field illumination is provided, an optimal optical system can be selected in accordance with the type of defect to be detected and an optimal inspection can be conducted.

The image comparator 15 also comprises a plurality of processors corresponding to the detection systems.

Figure 3:
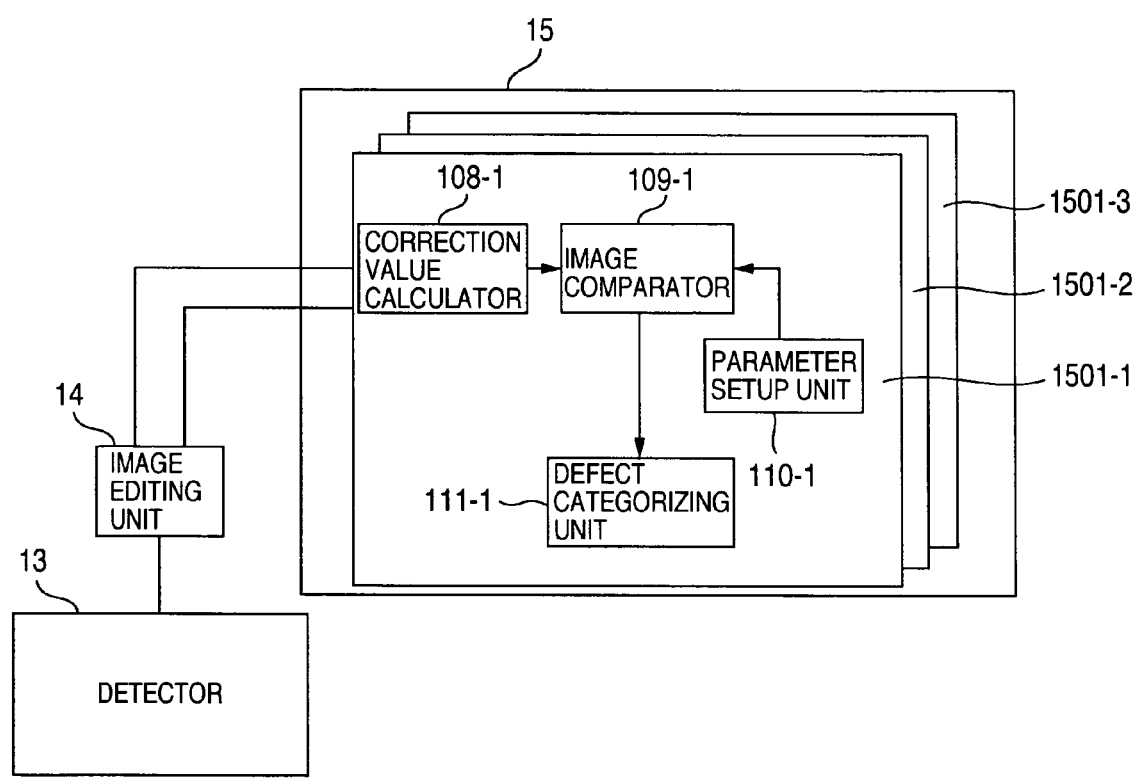
FIG. 3 is a diagram showing an example plurality of image comparison methods.
Figure 4A:
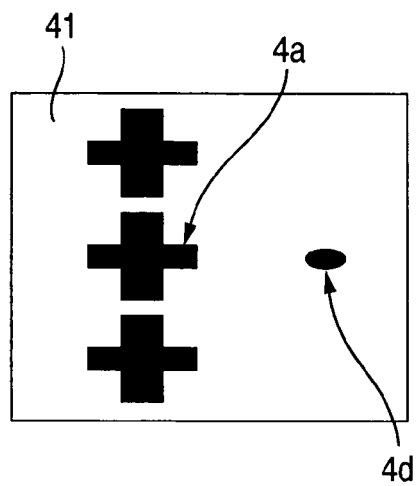
FIGS. 4A, 4B, 4C and 4D are diagrams respectively showing an object image for inspection, a reference image, a differential image and the waveform of the differential image at a position D-D'.
Figure 4B:
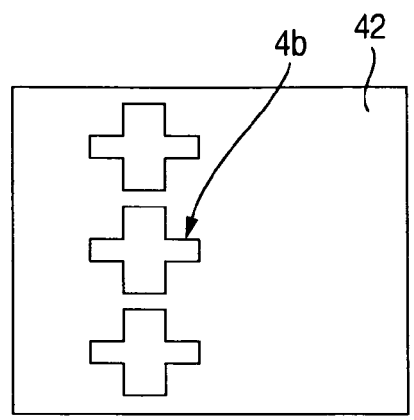
Figure 4C:
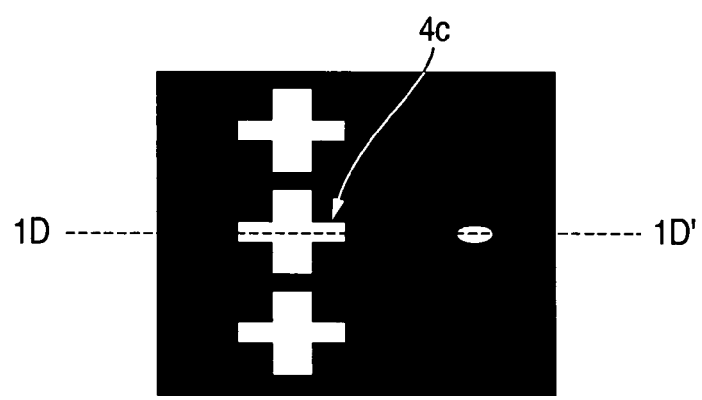
Figure 4D:
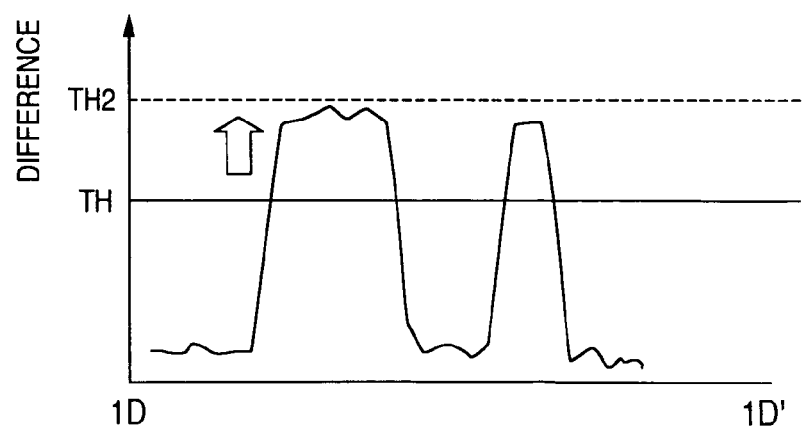
Figure 5:
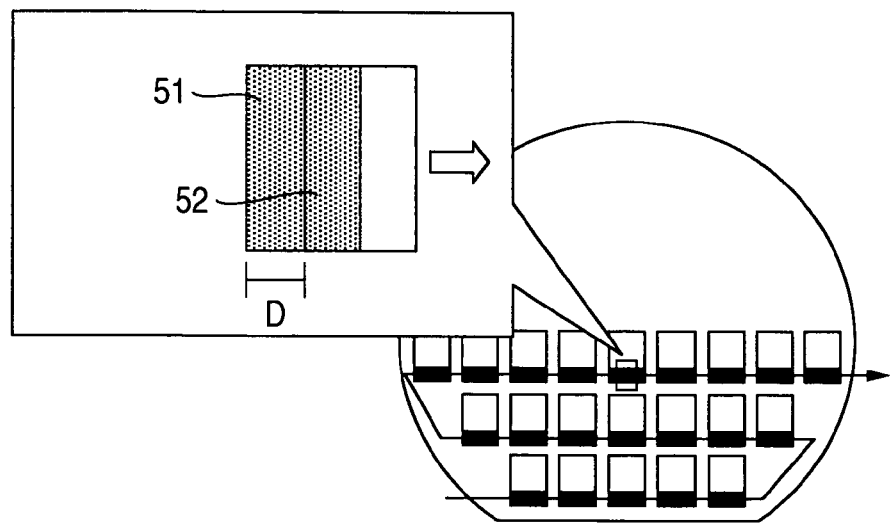
FIG. 5 is a plan view of a semiconductor wafer that is an example image comparison processing unit.

The arrangement of the image comparator 15 is shown in FIG. 3. The image comparator 15 includes a plurality of methods (1501 to 1503 in the example in FIG. 3) for individual functions, such as an image edition function, a position correction coefficient calculation function method, and a brightness correction coefficient calculation method. When a set of detection systems has been determined, the corresponding optimal combination of functions and the order of processes are determined. For example, according to the image comparison method 1501, defect candidates are extracted by 108-1 and 109-1, and a defect is detected and categorized by 111-1. At this time, a corresponding value is set as an image parameter by 110-1.

Figure 26:
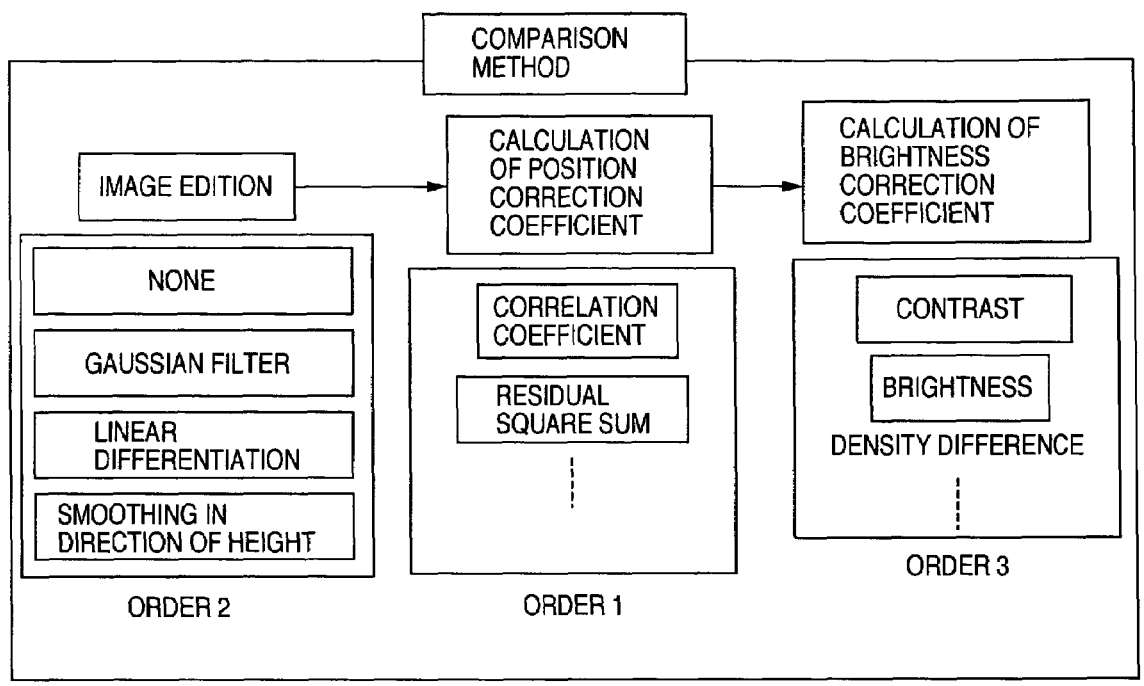
FIG. 26 is a diagram showing the optimal set of functions for an image comparison method and the processing order thereof.

As the optimal combination of the individual functions and the order of processes, example comparison processing is shown in FIG. 26, wherein calculation of a position correction coefficient using a correlation coefficient→image editing through smoothing in the direction of the height of an edge (smoothing of the amount of signals when a slight difference in the direction of the height of the sample 11 exists in an image)→calculation of a brightness correction coefficient using a contrast and brightness are performed in order. There are various other combinations and calculation orders, such as no image edition→collective calculation of a position correction coefficient and a brightness correction coefficient. This can be applied for the categorizing processing.

As is described above, a sample to be inspected is photographed under an optimal detection condition selected from among a plurality of detection conditions, and images are compared based on an image comparison method and a defect categorizing method corresponding to the detection condition. Then, a highly sensitive inspection is ensured, and a variety of types of defects can be detected.

Figure 9A:
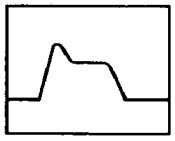
FIG. 9A is a diagram showing images, contrasts, density differences, luminance distributions and S/N for individual detection systems for target defects that are designated.
Figure 9B:
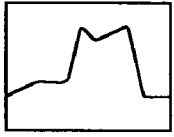
FIG. 9B is a diagram showing images, contrasts, brightnesses, differential values and luminance distributions for individual detection systems for target areas.

The optimal detection system selection method will now be described. As denoted by 801 in FIG. 8, first, information for a sample that is an object is input. For a semiconductor wafer, a step, a target area (e.g., a memory mat portion) and the coordinates of a target defect, if a defect as desired is already known, are designated. Then, a detection system is changed, and the images of the target area and the target defect are photographed, and an image contrast, a luminance value, the direction of a pattern, a patten density, and a difference (S/N) in luminance values of the defect and the peripheral portions are calculated, and the obtained values are displayed on the screen, as shown in FIGS. 9A and 9B. The images, the contrasts, the density differences, the luminance distributions and the S/Ns obtained by the individual detection systems for the designated target defect are shown in the example in FIG. 9A.

The images, the contrasts, the brightnesses, the differential values and the luminance distributions obtained by the detection systems for the target area are shown in the example in FIG. 9B. As a result, one or more conditions can be selected. A user may select the condition while monitoring the images and evaluation values, as displayed in FIGS. 9A and 9B; or the condition may be automatically selected from among the evaluation values. And, in accordance with the selected detection system, as denoted by 802 in FIG. 8, the inspection is conducted using the comparison method and the categorizing method that correspond to the detection system.

Figure 10:
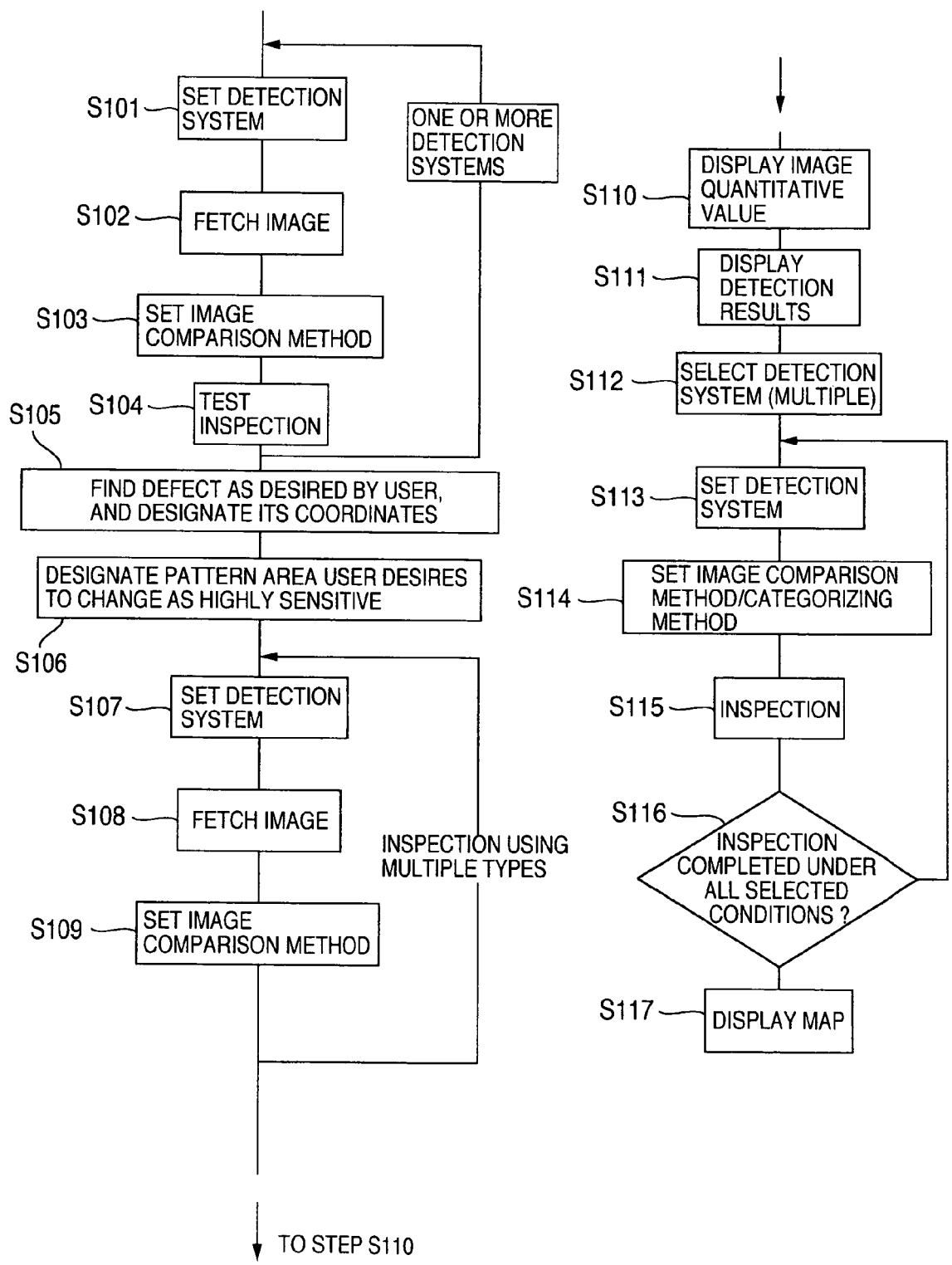
FIG. 10 is a flowchart showing example detection system setup processing.

FIG. 10 is a flowchart showing the processing for selecting a detection system based on a more detailed evaluation. First, a detection system is set (S101), an image is photographed (S102), an image comparison method corresponding to the detection system is set (S103), and a test inspection is performed (104). This processing is repeated for several detection systems. When a target defect is found by one of detection systems, the coordinates of the defect are designated (S105). A user also designates the coordinates of an area, such as a memory mat portion, to be highly sensitively inspected (S106). When a target defect to be detected is already known, this test inspection need not be performed. Then, the defects designated by the detection systems and the images in the designated areas are obtained (S107 to S109), a quantitative evaluation value shown in FIGS. 9A and 9B is calculated and the detection results are displayed (S110). Further, a test inspection is conducted using the image comparison method that corresponds to the detection system that has been set, and the obtained results are displayed (S111). Thereafter, while taking into account the quantitative evaluation values of images obtained by the two detection systems, i.e., the different detection systems, and detection functions using the different image comparison methods, one or more optimal conditions are selected (S112). For the detection results while taking into account the image quantitative evaluation value and the function of the image comparison method, the same weight may be employed, or either the evaluation value or the function may be weighed. As a result, the optimal detection systems are selected (S113), and corresponding image comparison methods and corresponding categorizing methods are selected (S114). Thereafter, inspections are performed under all the selected inspection conditions (S115), and when the inspections have been completed under all the selected conditions (S116), the results are displayed in a map form on the display screen (S117).

Figure 11A:
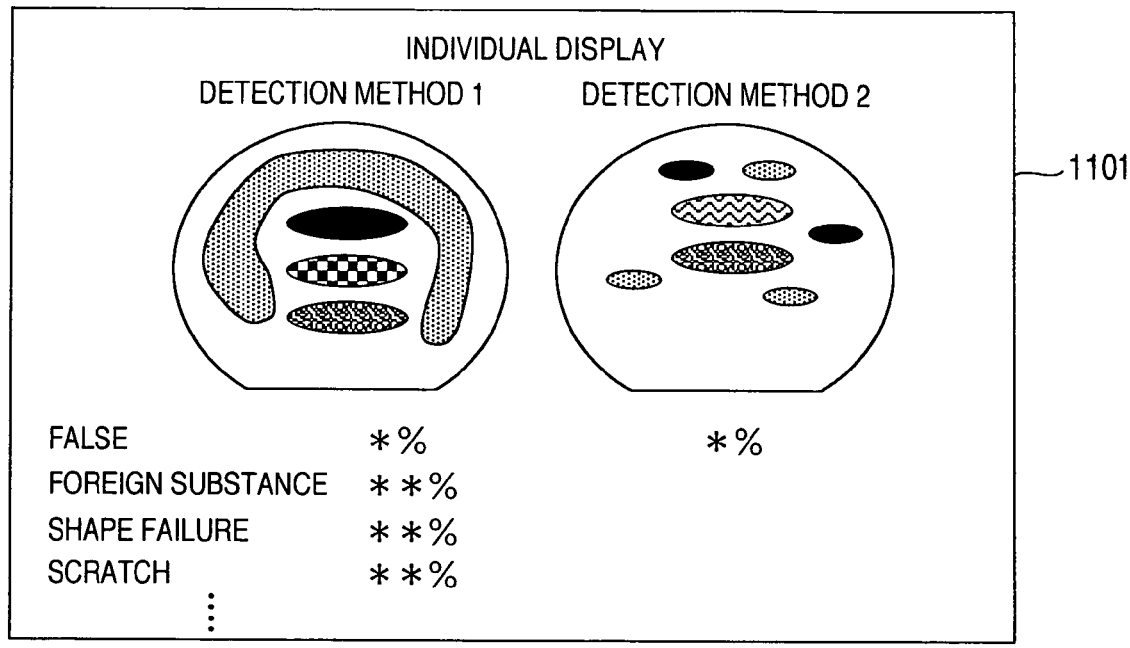
FIGS. 11A and 11B are diagrams showing example displays of inspection results obtained by a plurality of detection systems, comparison methods and categorizing methods.
Figure 11B:
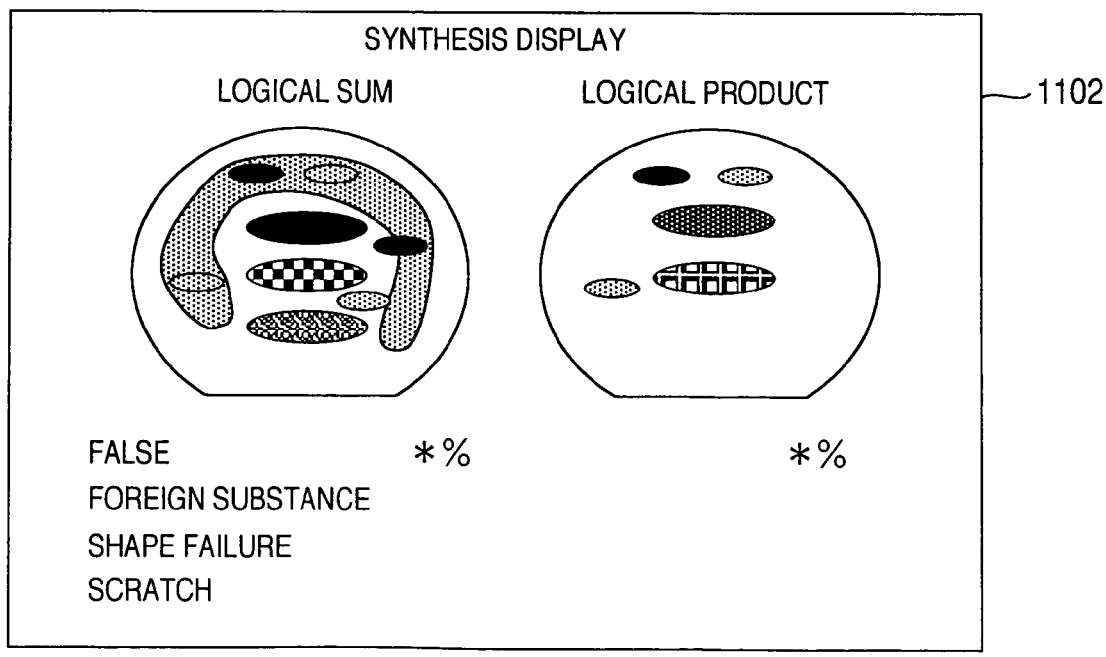

In FIGS. 11A and 11B are shown one or more selected detection systems, and defect detection and categorization results obtained by the corresponding comparison methods and the corresponding categorizing methods. The inspection results obtained by a plurality of detection systems can be displayed for the individual systems, as denoted by 1101. Or, as denoted by 1102, the logical product or the logical sum of the detection results obtained by the detection results may be calculated, and the inspection results may be synthesized and displayed. As the detection results, the presence or the absence of a detected defect may be displayed as a map; however, as denoted by 1101 and 1102, when the categorization results are displayed on a map, a user can understand at a glance the best condition wherein a target defect can be detected.

Figure 13:
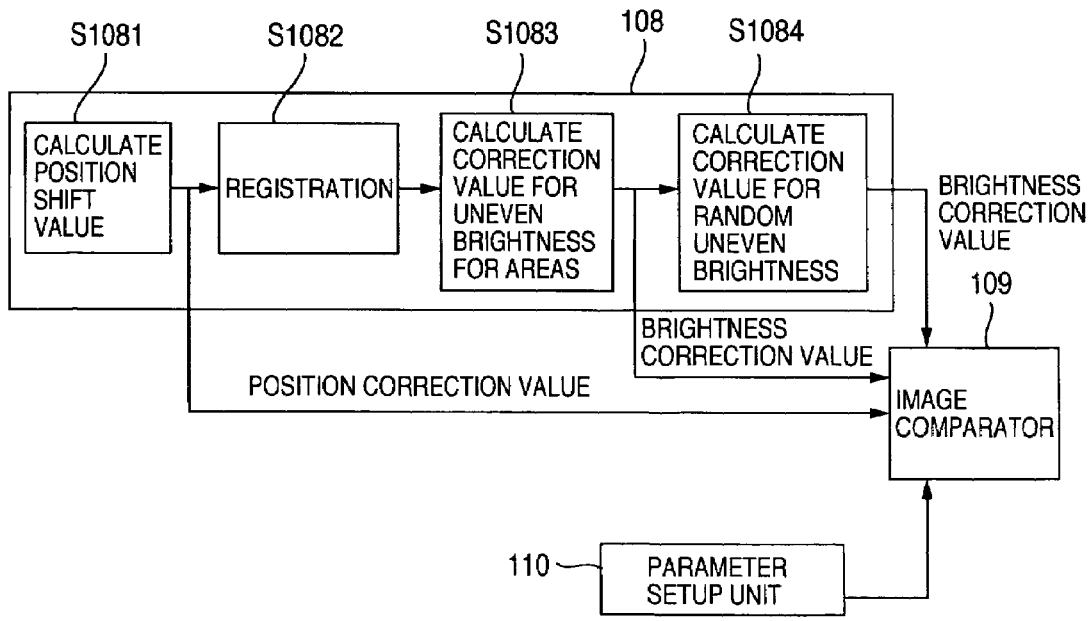
FIG. 13 is a flowchart showing example processing performed by a correction value calculator 108.

Next, example processing performed by the image comparator 15 will now be described in detail while referring to FIG. 13. First, the image comparator 15 reads a detected image signal and a reference image signal that are sequentially input to the memory 107 in synchronization with the movement of the stage. These image signals for two chips are signals not exactly at the same locations due to the vibrations of the stage and the inclinations of the wafer mounted on the stage. Therefore, the correction value calculator 108 normally calculates a position shift distance between two images (S1081). The calculation of a position shift distance is performed sequentially by using, as one processing unit, a specific length in the direction in which the stage advances. Reference numerals 51, 52, . . . in FIG. 5 denote processing areas when length D (a pixel) is defined as one processing unit. Hereinafter, the processing area of this unit is described as a unit.

Relative to an input image, the position shift distance is calculated sequentially between individual units, such as the unit 51 and the unit of a corresponding adjacent chip, and then the unit 52 and the unit of a corresponding adjacent chip. In order to calculate a position shift distance, there are various methods, such as a method employing a normalized cross-correlation between images, a method for employing the sum of density differences between images and a method using the square sum of density differences between images, and one of these methods is selected. Then, based on the obtained position shift distance, registration of the two images is performed for each unit (S1082). Sequentially, for the two images that are aligned, a correction value for adjustment of uneven brightness is calculated at two steps. The factors that cause a difference in brightness are slight differences in the film thicknesses of the chips in the semiconductor wafer and fluctuations in the amount of illuminated light. The uneven brightness due to the slight differences in the film thicknesses that occurs depends on the pattern of the semiconductor wafer. Therefore, according to the invention, first, a correction value is calculated for uneven brightness that occurs, in a spatially continuous area, that depends on the pattern (S1083). Then, a correction value is calculated for uneven brightness that occurs at random (S1084). Image comparison is performed by employing these correction values that are obtained hierarchically and image parameters, such as a threshold value, that are designated by the parameter setup unit 110 in accordance with the individual detection conditions (109).

Figure 12:
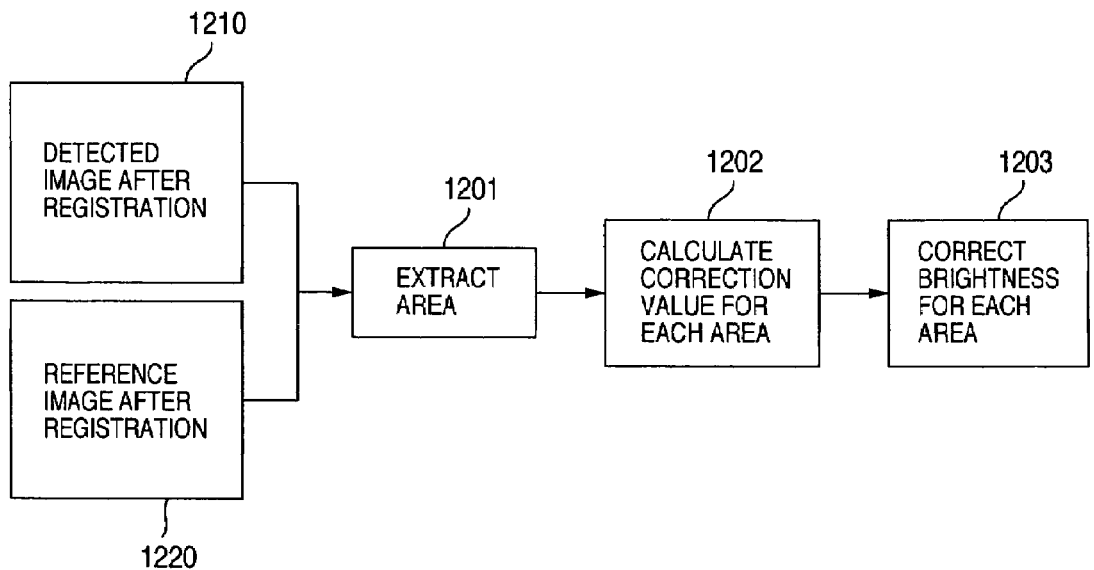
FIG. 12 is a flowchart showing example processing for correcting uneven brightnesses that occur in individual areas.

The process in FIG. 12 is a process for correcting differences in brightness that occur in individual areas. The spatially continuous areas are extracted from a detected image 1210 and a reference image 1220 after the registration has been completed (1201), and a correction value for brightness is calculated for each extracted area (1202). Based on the obtained results, the correction of brightness is performed for the individual areas (1203).

An example movement is shown in FIG. 28 when the correction of brightness is performed hierarchically according to the invention. Two defects 2701 (portions enclosed by (O) are present in a detected image (a), and are brighter than a background pattern having a belt shape, so that they can be distinguished from the background pattern. However, a corresponding pattern 2702 in a reference image (b) has the same brightness as a defect, and when a difference between the two images is simply calculated, a difference for the defect is small, as in a differential image (c). When a scatter diagram (d) for the brightnesses of a detected image and a reference image are prepared, the defect can not be identified from an evenly bright area. It should be noted that, in the scatter diagram (d), brightness is plotted while the vertical axis represents the detected image and the horizontal axis represents the reference image. Whereas, in this invention, as denoted by 2702, the partial image is extracted from a target image in accordance with a pattern or an area, and the correction value for the brightness is calculated for each area (1202 in FIG. 12). An example method for calculating a correction value is shown in (Ex. 1).

$$E_F = \frac{1}{(N \times M)} \sum_N \sum_M F(i, j)$$ (Ex. 1)

$$E_G = \frac{1}{(N \times M)} \sum_N \sum_M G(i, j)$$

$$\sigma_F = \sqrt{\frac{1}{(N \times M)} \left\{ \sum_N \sum_M (F(i, j) - E_F)^2 \right\}}$$

$$\sigma_G = \sqrt{\frac{1}{(N \times M)} \left\{ \sum_N \sum_M (G(i, j) - E_G)^2 \right\}}$$

Wherein F(i, j) and G(i, j) denote brightnesses at positions (i, j) of a detected image and a reference image after registration has been performed. Then, a correction value is calculated by (Ex. 2).

$$\text{gain} = \sigma_F / \sigma_G$$

$$\text{offset} = E_F - \text{gain} \cdot E_G$$ (Ex. 2)

Correction of the area is performed for the reference image by using (Ex. 3) (1203).

$$G(i, j) = \text{gain} \cdot G(i, j) + \text{offset}$$ (Ex. 3)

At this time, as denoted by 1202 in FIG. 28, a histogram for a density difference may be formed for each area (1202-1), and an offset value such that the peak position of the histogram is zero may be calculated as a correction value for a corresponding area and be employed for correction (1202-2).

Next, a correction value, which is used to adjust a difference in brightness that occurs at random, depending on the pattern of a semiconductor wafer, is calculated for each pixel. An example for this processing is shown in FIGS. 14 and 15A to 15E.

Figure 14:
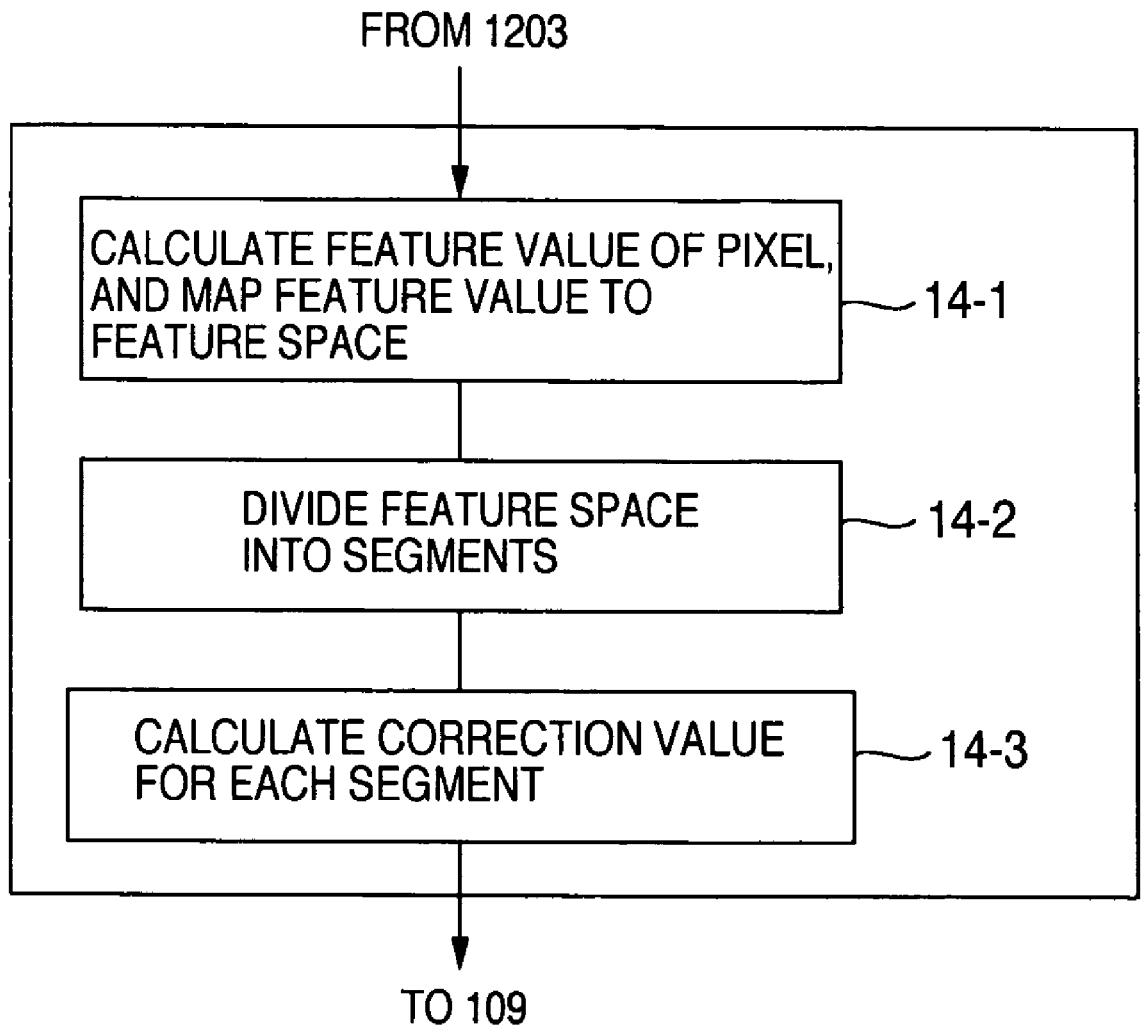
FIG. 14 is a flowchart showing example processing for correcting uneven brightnesses that occur at random.

First, the processing is shown in the flowchart in FIG. 14. For an image for which the brightness has been corrected for each area, as explained at step 1203 in FIG. 12, a feature value for each pixel is calculated and is mapped to the N-dimensional feature space with the feature value being used as an axis (14-1) ((f) in FIG. 28). Then, the feature space is divided into segments (14-2), and a correction value is calculated for each of the obtained segments (14-3).

Next, the processing based on the flowchart shown in FIG. 14 is shown in FIGS. 15A to 15E. Reference numerals 1501 and 1502 in FIG. 15A denote a reference image and a detected image that have been corrected at 1203, and an uneven brightness occurs at a repeated dot pattern. As a result, as shown in scatter diagram 15B, the distribution of data spreads, and a defect is not detected. For these images, feature values for the individual pixels are calculated and are mapped to the feature space, as shown in FIG. 15C (corresponds to 14-1 in FIG. 14). In FIG. 15C, the two-dimensional feature space is shown as an example, and (f) in FIG. 28 is an example wherein individual pixels are mapped in the N-dimensional feature space. The feature value can be an arbitrary thing, such as pixel contrast, brightness, a quadratic differential value, a density difference between corresponding pixels or a dispersion value using a neighboring pixel, so long as the feature for the pixel is represented. Further, the feature values may be mapped to a space wherein all the feature values are employed, or feature values effective for determining a defect may be selected and mapped. Following this, the feature space is divided into a plurality of segments (14-2 in FIG. 14), and a correction value is calculated for each segment by using the statistic amount of pixels belonging to the segment (14-3 in FIG. 14). FIGS. 15D and 15E are scatter diagrams that are formed by extracting, from the scatter diagram in FIG. 15B for the entire image, pixels included in the segments obtained from the feature space. Then, the correction value is calculated based on the scatter diagrams for the individual segments in FIGS. 15D, 15E . . . . As a result, as shown in a density differential image in (e) in FIG. 28, the uneven brightness of the dot pattern is corrected, and a defect can be detected.

An example division method for dividing the feature space in FIG. 15C into segments is shown in FIGS. 16A and 16B. According to this invention, the feature space is automatically divided into segments in accordance with a target image. The upper graph in FIG. 16A shows an example feature space according to a brightness and density difference. The lower graph shows an example histogram indicating the frequency of each brightness level (luminance value), and a threshold value used for division in the direction of brightness is determined based on the histogram of the brightness of the target image.

Figure 17:
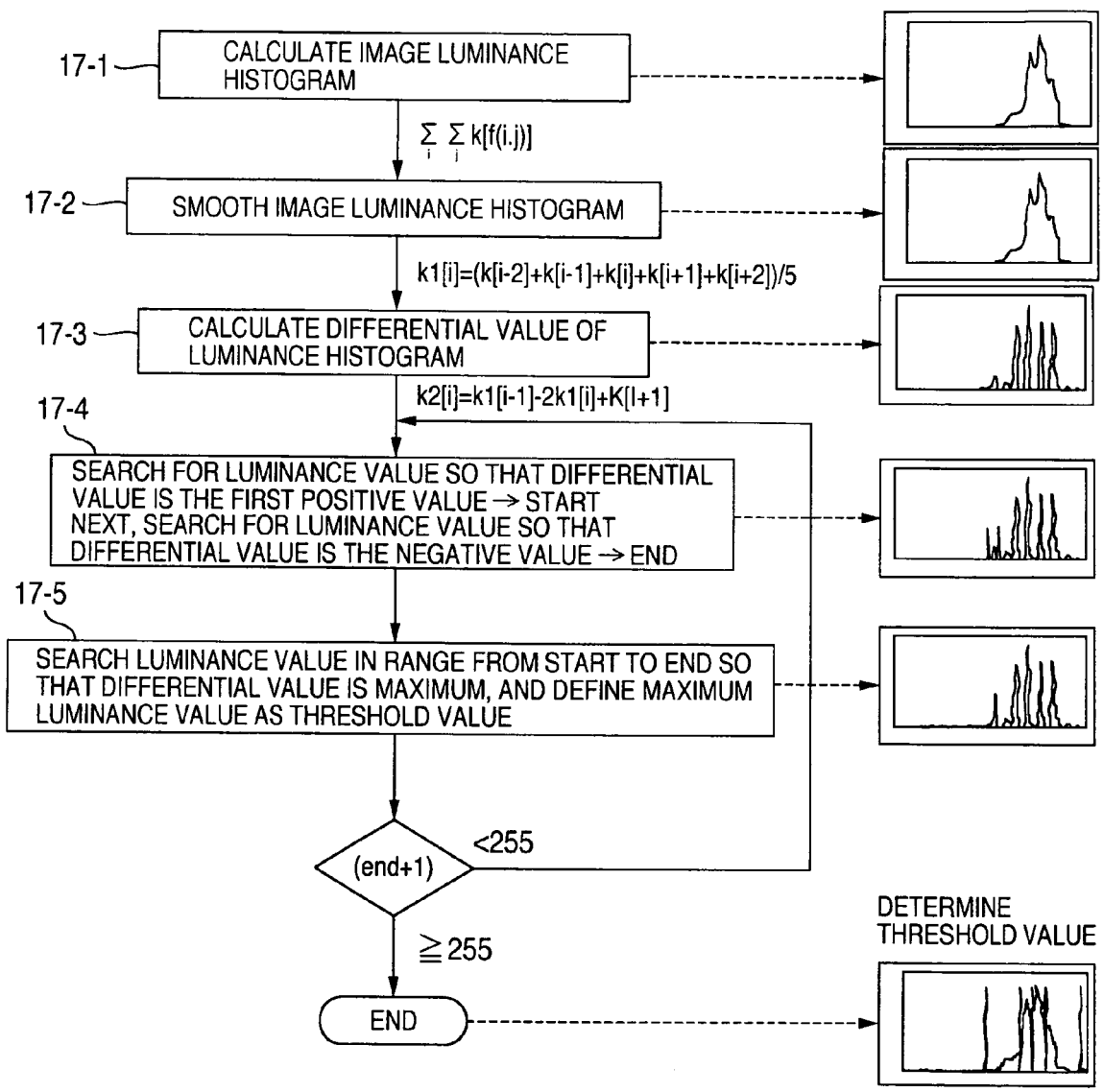
FIG. 17 is a flowchart showing the processing for dividing a feature space into segments.

Example processing is shown in FIG. 17. First, a histogram for luminance values in a target area is calculated (17-1). The histogram may be calculated based on a detected image or a reference image, or based on the average value of the two images. Then, the luminance histogram is smoothed and small peaks are removed (17-2), and differential values for the smoothed histogram are calculated (17-3). Thereafter, the differential values are examined, beginning from the lowest brightness, and the luminance value whereat the differential value is positive is defined as Start, while the luminance value whereat the next differential value is negative is defined as End (17-4). And the luminance value for which the differential value is the maximum in the range from Start to End is defined as a threshold value used for division (17-5). Through this processing, as shown in FIG. 16A, the division is performed at the portion for the valley of the histogram. This means that the segment division is performed in accordance with the pattern in the target area. The segment division can be performed either in accordance with the pattern in the image, or, as shown in FIG. 16B, in accordance with a fixed value designated by a user.

Figures 27A, 27B, 27C:
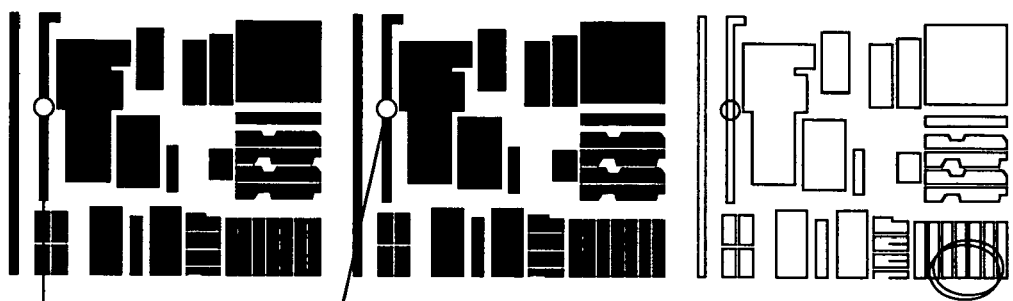
FIGS. 27A, 27B and 27C are diagrams showing a detected image, a reference image and a differential image.
Figure 27D:
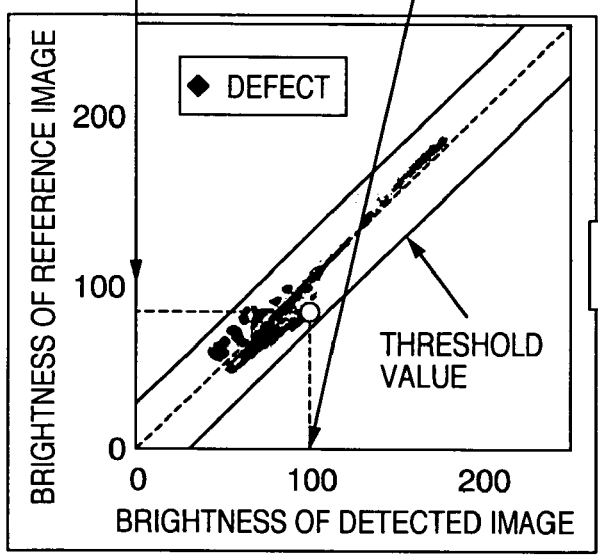
FIG. 27D is a scatter diagram for a detected image and a reference image.
Figure 27E:
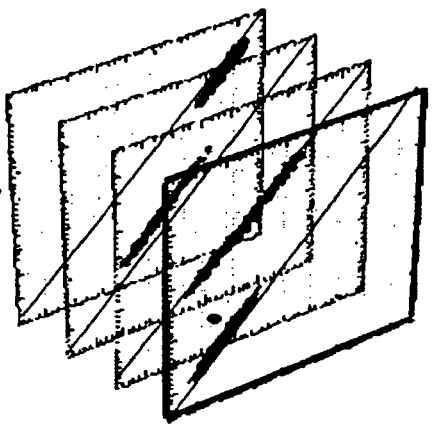
FIG. 27E is a diagram showing the division of the scatter diagram for individual feature values.
Figure 27F:
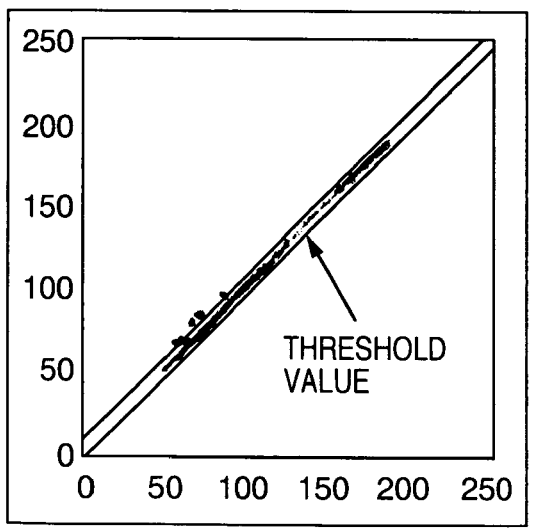
FIG. 27F is a scatter diagram for a detected image and a reference image for which brightnesses have been corrected in accordance with correction values for individual pixels that are obtained based on the scatter diagrams of the individual feature values.
Figure 27G:
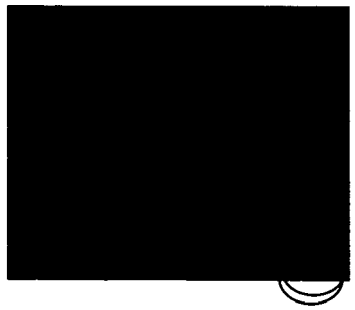
FIG. 27G is a diagram showing a differential image obtained from the detected image and the reference image for which the brightnesses have been corrected using the correction values for the pixels.

In FIGS. 27A to 27G, an example movement in the processing in FIG. 14 for calculating a correction value for each pixel is shown by employing scatter diagrams. A large brightness difference exists between a detected image (FIG. 27A) and a reference image (FIG. 27B), and as shown in a differential image (FIG. 27C), this difference is increased. FIG. 27D is a scatter diagram between FIGS. 27A and 27B. This diagram is exploded in accordance with the feature values, as shown in FIG. 27E, and a correction value is calculated for each scatter diagram and a correction is performed. Then, as shown in FIG. 27F, data distribution in the scatter diagram between FIGS. 27A and 27B is suppressed, and as shown in a differential image (FIG. 27G) obtained by a correction, the difference is reduced.

For each of the scatter diagrams obtained by segment division, as shown in FIGS. 15D and 15E, a linear formula is obtained using the least-squares approximation in the scatter diagram, and the inclination and the y intercept are regarded as correction values. The correction values may be obtained using (Ex. 1) and (Ex. 2), described above, based on the pixels belonging to each segment. Further, an area that forms the feature space may be arbitrarily designated as the minimum 1×1 pixel. It should be noted, however, that when the 1×1 pixel that has the highest frequency is employed, the correction would be performed, including for a defect, so that a slightly larger area should be designated.

As is described above, (1) since the brightness is corrected for each area, a defect hidden by the uneven brightness of the background is revealed; (2) since brightness is corrected for each pixel, an uneven brightness that occurs at random is suppressed; and since hierarchical brightness is corrected, only a defect can be detected ((e) in FIG. 28)).

Figure 18A:
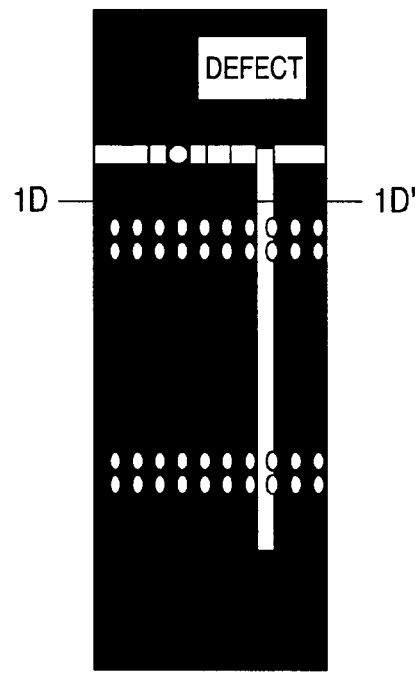
FIG. 18A is a diagram showing a differential image after registration has been performed.
Figure 18B:
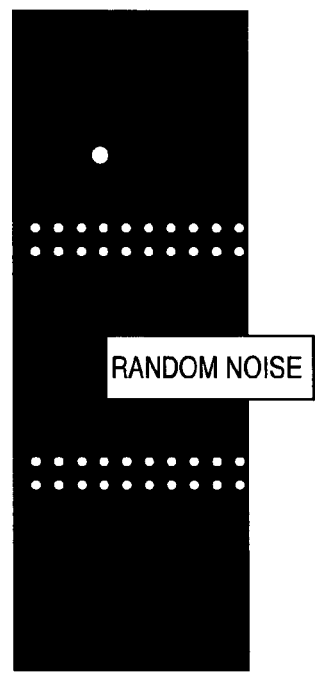
FIG. 18B is a diagram showing a differential image after uneven brightnesses in areas have been corrected through registration.
Figure 18C:
FIG. 18C is a diagram showing a differential image after uneven brightnesses for pixels have been corrected through registration.
Figure 18D:
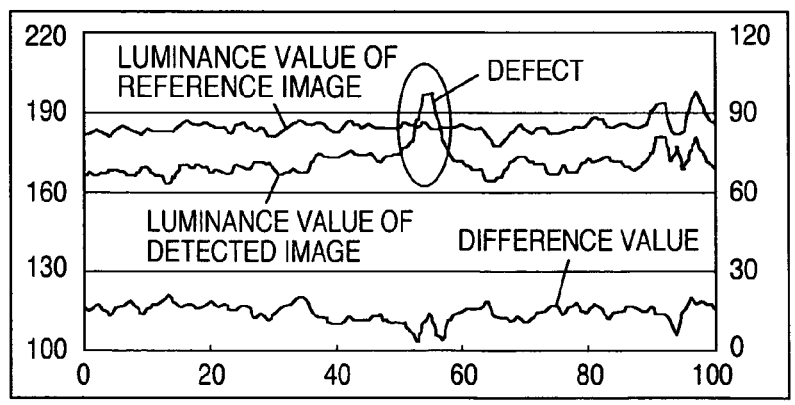
FIG. 18D is a graph showing distributions of luminance values and difference values for a reference image and a detected image at 1D-1D' in FIG. 18A.
Figure 18E:
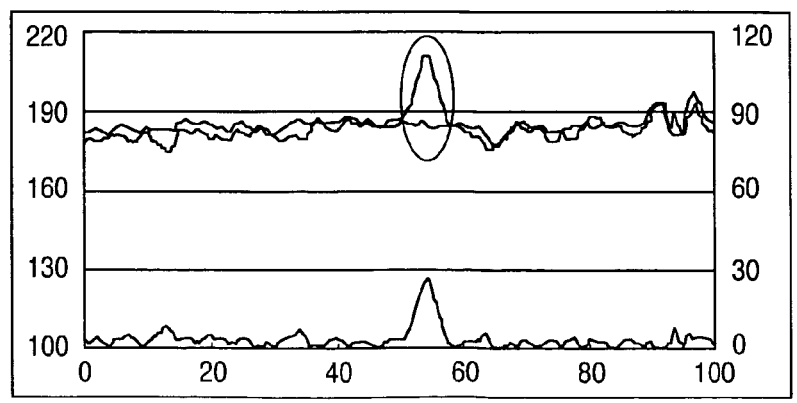
FIG. 18E is a graph showing distributions of luminance values and difference values for a reference image and a detected image in FIG. 18B.

Brightness correction results obtained using the method of the invention are shown in FIGS. 18A to 18E. A differential image obtained after registration is shown in FIG. 18A, and defects are present at positions enclosed by O. The luminance waveforms for two images, including defect portions, after registration at 1D-1D' and a difference value are shown in FIG. 18D. A defect is present in the detected image, and that portion is brighter than the other portion, while the reference image is bright as a whole, and the difference value for the defect portion is smaller than the peripheral portion. As a comparison, a differential image obtained by correcting differences in brightness for the individual areas is shown in FIG. 18B. The uneven brightnesses having a belt shape are extracted as areas and are corrected. As a result, as shown in FIG. 18E, the luminance values are adjusted and a defect hidden in the uneven color of the background is revealed. However, a difference in brightness that occurs at random, depending on the repeated pattern, is not yet corrected.

In the example in FIG. 18C, a correction value for each pixel is calculated based on the statistical amount of the entire image area in FIG. 18B and the differences in brightness are corrected, and an obtained differential image is shown. In this manner, since two or more different processing methods are employed to hierarchically calculate a brightness correction value, the differences in brightness that are caused by different conditions can be corrected, and a defect for which a weak signal is hidden in a large uneven brightness can be revealed and detected.

The present invention can cope with a case wherein a larger uneven brightness is present. In a detected image in FIG. 19A and a reference image in FIG. 19B, uneven brightness exists in a background 1901, and a difference in a portion corresponding to 1901 is increased in a differential image (FIG. 19C). As for the distribution of data in a scatter diagram between FIGS. 19A and 19B, a part of a brightness area spreads, as shown in FIG. 19D. Whereas, as shown in FIG. 13, position shifting is normally performed before the correction of uneven brightness, a correct position shift distance may not be calculated when the difference in brightness is great. On the other hand, when the position shifting occurs, a correlation of pixels can not be obtained between images, and an exact brightness correction value can not be calculated. Therefore, the present invention provides a unit that adjusts the position shift and the brightness difference.

Examples in FIGS. 20A to 20E show larger uneven brightnesses than those in FIGS. 19A to 19D. A background 2001 in FIG. 20A is brighter; however, a pattern 2002 that is overlaid has almost no difference in brightness. As for patterns 2003 thereon, some are brighter while the others are dark in FIG. 20A, and the brightness is inverted relative to that in FIG. 20B. The scatter diagram for such an image (FIGS. 20A and 20B) shows a positive correlation and a negative correlation, as shown in FIG. 20D. However, using the method for employing the square sum of the density difference to calculate the position shift distance, so that the brightness difference is a minimum value, a correct position shift distance can not be obtained. Further, using a method for employing a normalized correlation robust enough for uneven brightness, calculation of a correct position shift distance is impossible for an image wherein both a positive correlation and a negative correlation exist. A correlation coefficient between FIGS. 20A and 20B is shown in FIG. 20E, and it indicates that a value is small as a whole and that a position shift distance can not be calculated.

Figure 21A:
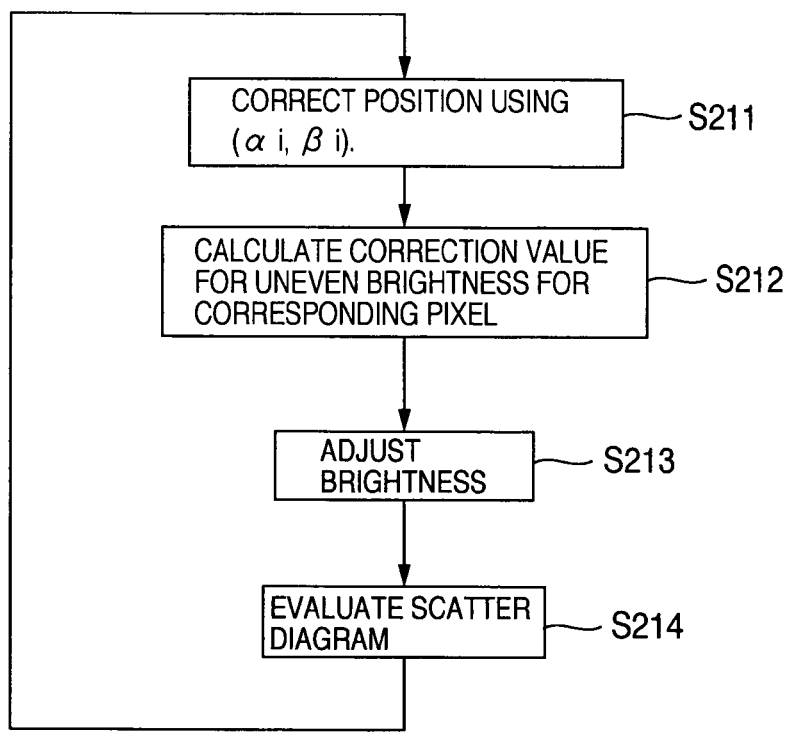
FIGS. 21A and 21B are diagrams showing example processing for registration relative to large uneven brightnesses, and for correction of brightness.
Figure 21B:
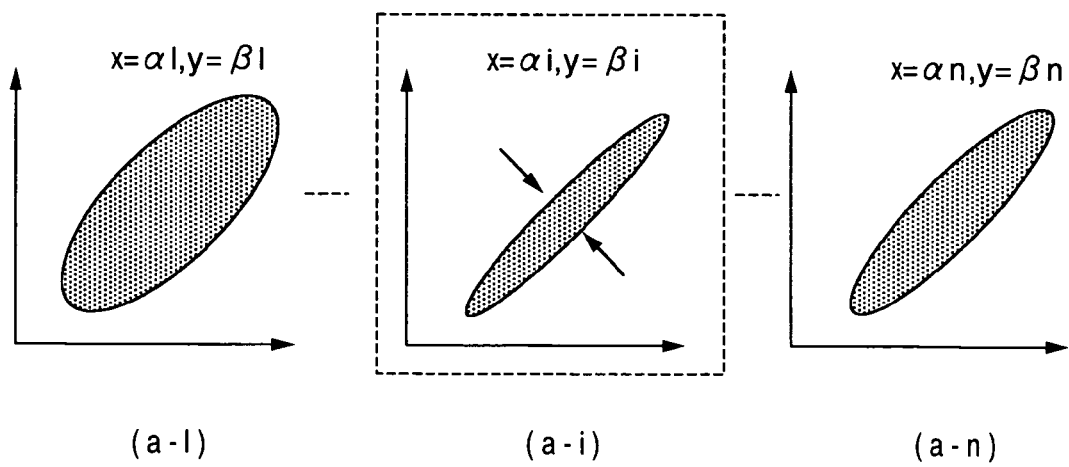

Therefore, according to this invention, as shown in FIG. 21A, the position correction value is allocated (($\alpha i$, $\beta i$)) for the periphery by using the position shift distance ($\alpha$, $\beta$) of the preceding unit, and the position correction (S211)→calculation of the uneven brightness correction value (S212)→adjustment of brightness (S213)→evaluation of the scatter diagram (S214) are repeated. Then, as shown in FIG. 21B, of the scatter diagram data (a-1), (a-i) and (a-n) in the individual position correction processes, (a-i) with the smallest discrepancies is employed to perform the inspection. The discrepancies in scatter diagram data are calculated by using the square sum of the difference in the pixels.

At this time, as shown in FIGS. 29A and 29B, first, the scatter diagram may be exploded in accordance with the feature values of the pixels in the manner as shown in FIGS. 15A to 15E, and the processing in FIGS. 21A and 21B may be repeated for each scatter diagram. That is, the position shift distance is allocated (($\alpha i$, $\beta i$)) for each scatter diagram, and the position correction (2901)→calculation of an uneven brightness correction value for a corresponding pixel (2902) →correction of brightness (2903)→evaluation of a scatter diagram (2904) are repeated. Then, a position shift distance (($\alpha i$, $\beta i$), and a brightness correction value, whereby data in a scatter diagram are spread the least, i.e., for which the sum of the difference between corresponding pixels of images is the minimum, are employed (2905).

Figure 22:
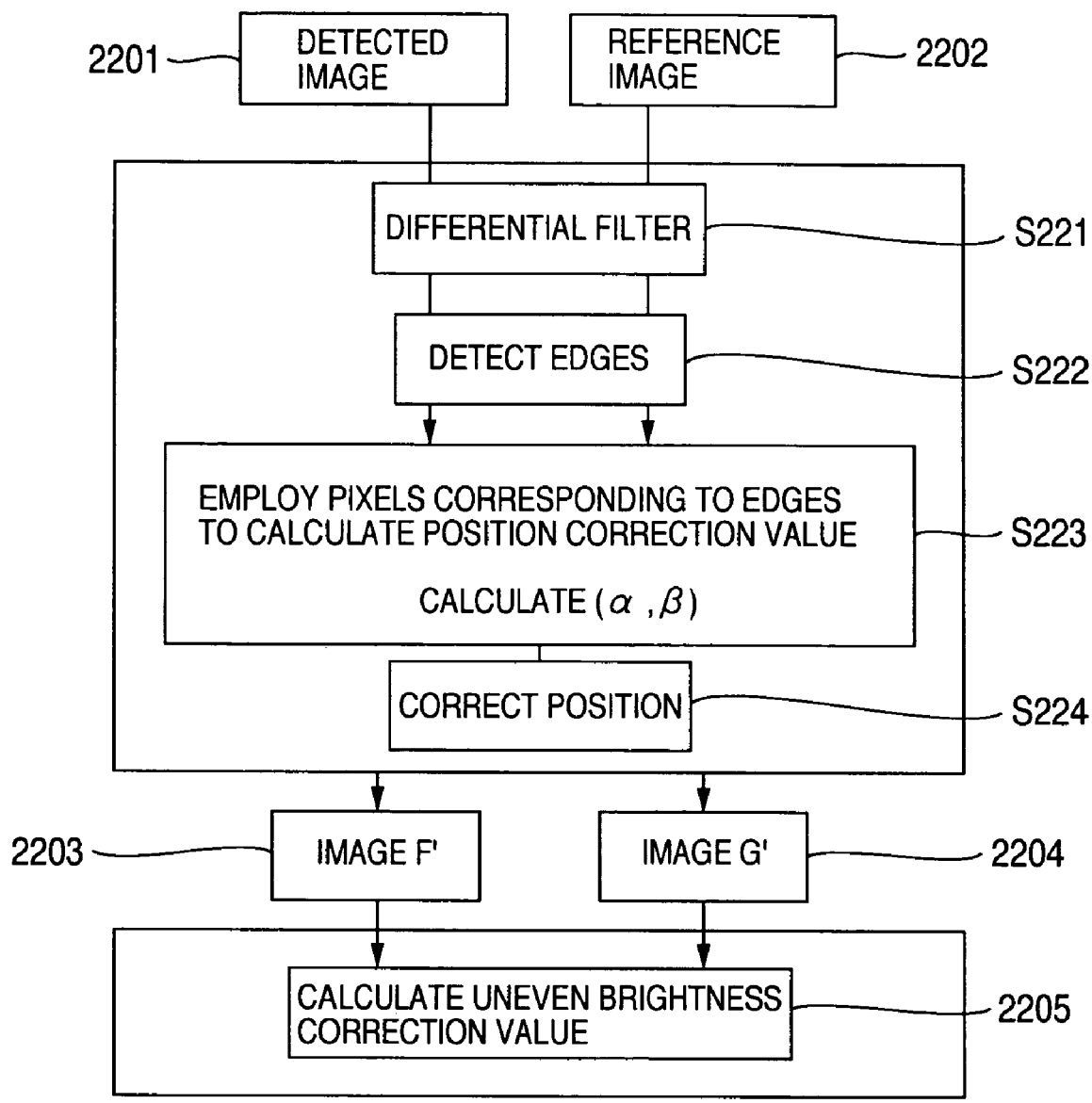
FIG. 22 is a flowchart showing example registration and brightness correction processing relative to large uneven brightnesses.

As another method, as shown in FIG. 22, a detected image 2201 that is a target image and a reference image 2202 are passed through a differential filter (S221), and the edges of patterns are detected in the image (S222). A position correction value ($\alpha$, $\beta$) is calculated by employing only the pixels that correspond to the edges (S223) and is employed to correct the positions (S224), and an image F' (2203) and an image G' (2204) are obtained. As a result, a position shift distance can be calculated while the affect of an uneven brightness is removed, and by using these results, an uneven brightness correction value can be calculated (S225). In the detection of edges at (S222), pixels for which the brightness gradient is sharp between adjacent pixels, i.e., pixels with large linear differential values or pixels with zero-crossing of quadratic differential values should be selected.

Selection of pixels effective for calculation of a position shift distance is not limited to that for the edges where the brightness gradient is large. As shown in FIG. 32, for pixels of a detected image 2201 and a reference image 2202, a difference between adjacent pixels is calculated (S321) and a symbol array of the difference values is obtained (S322). For simplification, when image data in this case is regarded as a one-dimensional array, differences df(i) and dg(i) between pixels f(i) and g(i) of a detected image and a reference image and adjacent pixels are calculated as in (Ex. 4).

$$df(i)=f(i+1)-f(i)$$

$$dg(i)=g(i+1)-g(i) \quad \text{(Ex. 4)}$$

Symbol arrays cf(i) and cg(i) are obtained
 if df(i)≧0 then cf(i)=1 else cf(i)=0
 if dg(i)≧0 then cg(i)=1 else cg(i)=0
Thereafter, pixels for which the symbol array match, including neighboring areas (because, originally, a position shift exists between images) are selected, a position correction distance ($\alpha$, $\beta$) is calculated (S323), and position correction is performed (S324). As a result, a pattern wherein brightness is partially inverted can be removed, and position correction can be performed.

Furthermore, as an index for the selection of pixels that are effective for the calculation of a position shift value, as shown in FIG. 33, dispersion values fs and gs may be calculated by using (Ex. 5) in accordance with n neighboring pixels f(i) and g(i) of pixels f and g in a detected image 2201 and a reference image 2202 (S331).

$$fs = \frac{1}{n}\sum_{i=1}^{n}(f(i)-\overline{f}) \quad \text{(Ex. 5)}$$

$$gs = \frac{1}{n}\sum_{i=1}^{n}(g(i)-\overline{g})$$

Then, pixels near the two values may be selected, to calculate a position correction value ($\alpha$, $\beta$) (S333), and the position correction may be performed (S334).

$$\overline{f}, \overline{g} \quad \text{(Ex. 6)}$$

In this case, expression (6) represents the average luminance of the n neighboring pixels.

The example pixel selection method for calculating the position shift distance has been described. However, another selection index may be employed. The present invention selects pixels by using an arbitrary index, in other words, removes pixels that adversely affect the calculation of the position shift distance and ensures accurate calculation of the position shift distance.

Figure 23:
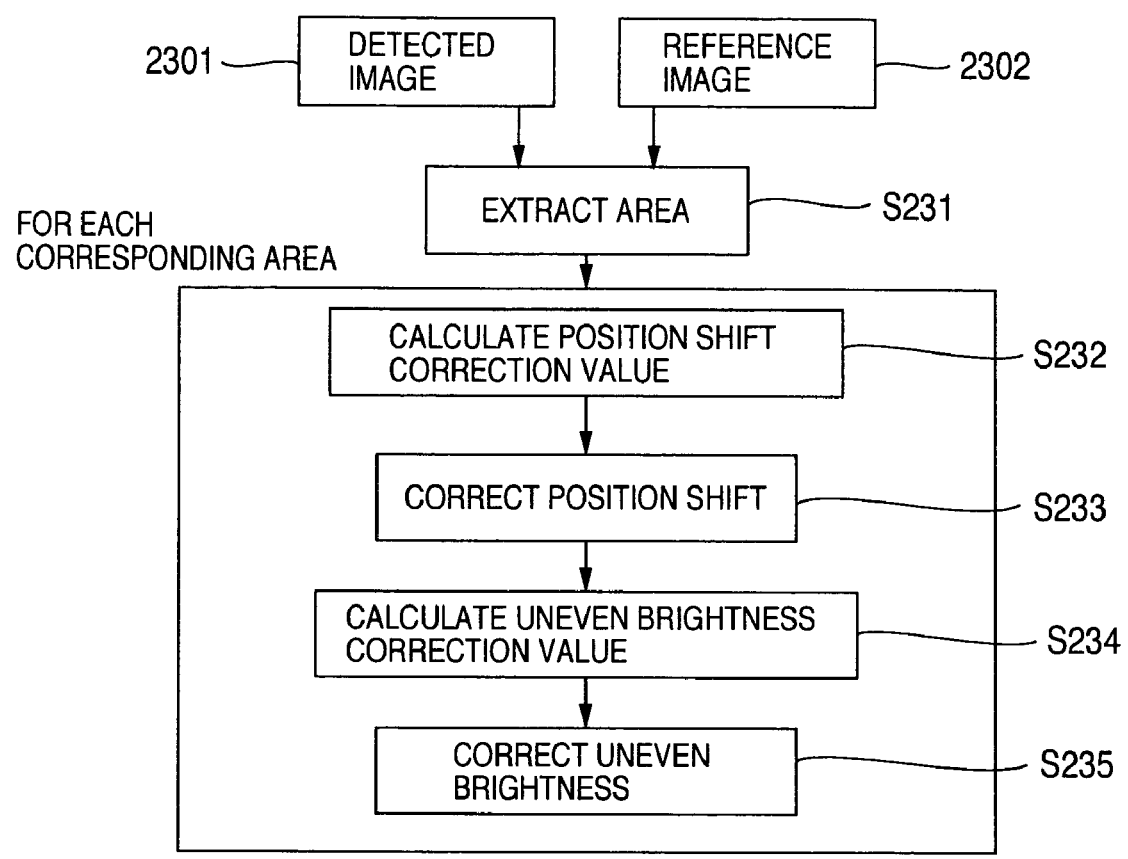
FIG. 23 is a flowchart showing example registration and brightness correction processing for large uneven brightness.

As another method, as shown in FIG. 23, areas are extracted from a detected image 2301 and a reference image 2302, and position correction value calculation (S232), position correction (S233), calculation of an uneven brightness correction value (S234) and correction of uneven brightnesses (S235) are performed for corresponding areas. As a result, a position shift correction value and a brightness correction value can be calculated separately for a portion wherein a positive correlation exists and a portion wherein a negative correlation exists.

Figure 24:
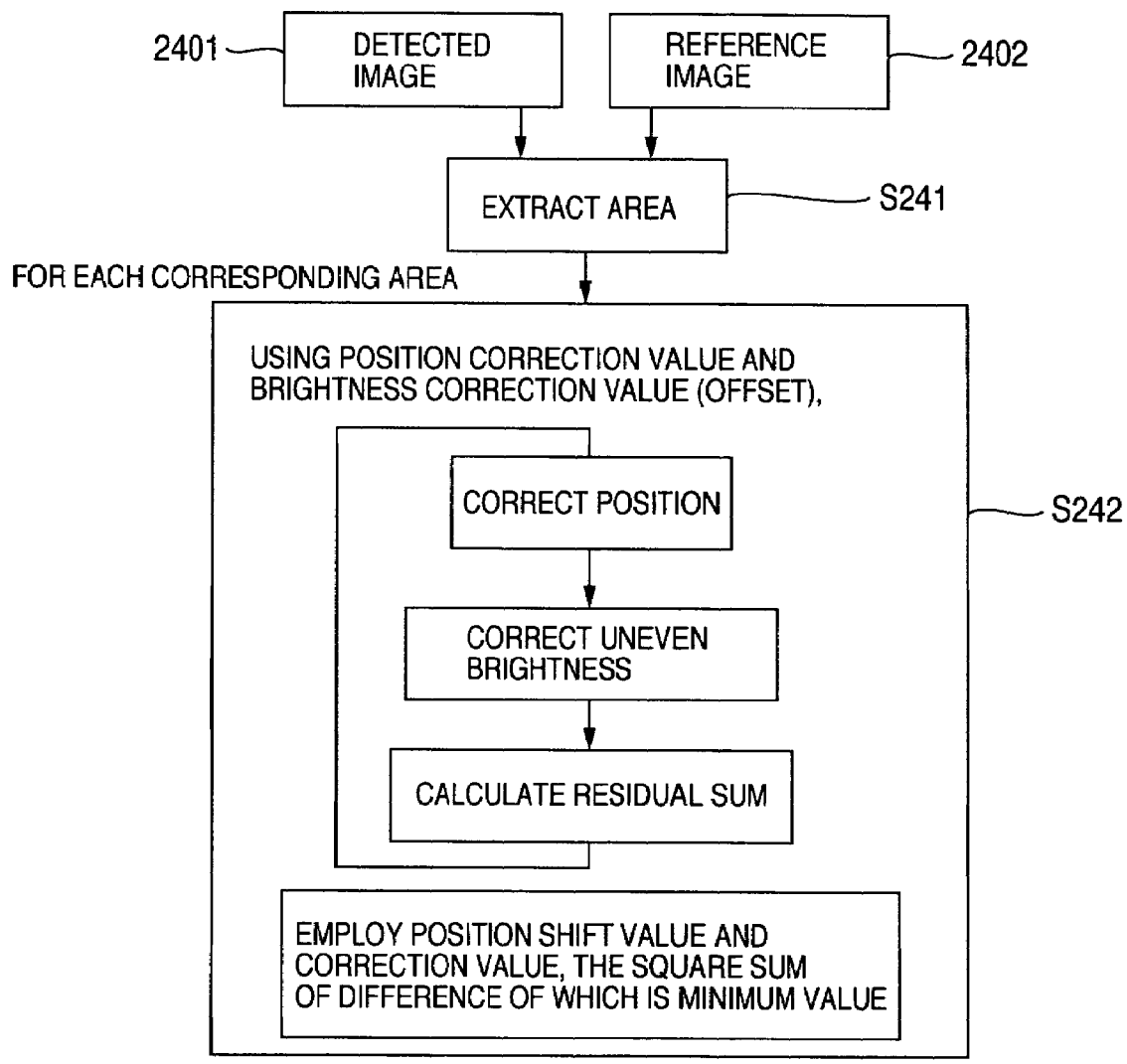
FIG. 24 is a flowchart showing example registration and brightness correction processing for large uneven brightness.

As an additional method, as shown in FIG. 24, areas are extracted from a detected image 2401 and a reference image 2402 (S241), a position correction value and a brightness correction value are allocated as parameters for corresponding areas, and a position correction value and a brightness correction value, the square sum of the difference of which is the minimum, are employed (S242).

As one more method, as shown in FIG. 30, area extraction and explosion of a scatter diagram, based on the feature values for individual pixels, are performed for a detected image 3001 and a reference image 3002 (S301). Then, a position correction value and a brightness correction value are allocated as parameters for area information and the individual scatter diagrams that are obtained based on the feature values, and a position correction value and a brightness correction value, the square sum of the difference of which is the minimum, are employed (S302).

As a further method, as shown in FIGS. 25A to 25D, the scatter diagram (FIG. 25A) is changed by Hough conversion, and distribution data are separated into data for a negative correlation and data for a positive correlation (FIGS. 25B to 25D). Thereafter, for the separated distribution data, a position correction value and a brightness correction value are calculated so that the discrepancies in the scatter diagram data are the minimum.

The effects obtained by performing brightness correction for an inspection image at multiple steps, in the manner described above, will now be explained for a case, for example, of inspecting a pattern that is formed on a semiconductor wafer wherein, through the CMP step, the surface is covered with an optically transparent, flat insulating film. When the wafer, after being CMP machined, is photographed by the detector 13, the obtained image is affected, for example, by variances in the thickness of the insulating film on the wafer plane and the distribution of the amount of reflected light that occurs due to the density of the patterns in the chip, and the brightness is varied. For the image, wherein the brightness is varied, brightness correction is performed at multiple steps, for different units and using the method described above, so that the affect of the uneven brightnesses between images can be reduced and a defect can be revealed. Therefore, a ratio for the detection of defects can be increased.

Further, a differences in brightness (uneven color) between chips, which occurs due to various factors, such as the difference in film thicknesses between chips, differences in the amount of accumulated light due to the uneven speed of the stage or the fluctuation of illumination, is adjusted by using a plurality of different methods (i.e., correction values are calculated for a plurality of different areas). Thus, a defect for which a weak signal is hidden in large uneven brightnesses can be revealed and be detected.

The above described processing performed by the image comparator 15 of the invention can be provided by software for a CPU. Or the core computation portions, such as the normalized correlation computation and the shaping of the feature space, may be provided by hardware. With this arrangement, the processing speed can be increased. Further, according to the invention, although following the CMP planarization process there is a slight difference in the pattern thicknesses, or although there is a large difference in brightness between comparison dies due to a reduction in the wavelength of illuminating light, defects of 20 nm to 90 nm can be detected.

Furthermore, according to the invention, during the inspection of low k films, like inorganic insulating films such as $SiO_2$, SiOF, BSG, SiOB or porous silia film, or like organic insulating films such as methyl containing $SiO_2$, MSQ, polyimido film, palerin film, Teflon (trademark) film or amorphous carbon film, defects of 20 nm to 90 nm can be detected, even though there are local differences in brightness due to variations in the refractive index distribution in the film.

An example semiconductor apparatus manufacturing system that employs the pattern inspection apparatus of the present invention will now be described while referring to FIG. 31. A circuit pattern on a wafer is formed sequentially by a plurality of apparatuses A, B, . . . and E (3101). After the manufacturing apparatuses have completed their processes, the inspection and defect categorizing are performed by the pattern inspection apparatus of this invention, so that a defect type, an apparatus wherein the defect occurred and how the defect occurred can be traced. For example, a wafer processed through the step at the apparatus B is inspected, and a defect that is detected is a defect carried from the preceding apparatus A or a defect that occurred in the apparatus B. When the defect is compared with defect data obtained through the inspection following the step by the apparatus A, it is determined whether the defect is either a defect that occurred in the apparatus B or a defect carried by the apparatus A (3102). Of the defects carried from the preceding apparatus A, a foreign substance may not cause a shape defect or discoloration in the apparatus B, and a pattern to which a fatal substance is attached is always defective in shape or is discolored in the following apparatus, while a pattern to which a non-fatal substance is attached does not become defective in shape in the following apparatus and is still a good product. Therefore, by using the pattern inspection apparatus with this configuration, the coordinates of a the defect categorized as a foreign substance are stored, and when the pattern is passed through the succeeding apparatus, the defect detection and categorizing are again performed to determine whether the foreign substance is fatal. Through this processing, the state of the manufacturing apparatus can be more exactly understood.

The embodiment of the present invention has been explained by employing, as an example, a comparison of inspection images using an optical visual inspection apparatus that employs a semiconductor wafer as an object. However, the present invention can also be applied for images to be compared for an electron pattern inspection. Further, the inspection object is not limited to a semiconductor wafer, and so long as the detection of a defect is performed by a comparison of images, the present invention can also be applied for a TFT substrate, a photomask or a print board.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

The invention claimed is:

1. A pattern inspection method performed by an inspection apparatus comprising the steps of: irradiating corresponding areas of two identical patterns that are formed on a sample, while adjusting a ratio of light quantities emitted obliquely and from above; photographing the corresponding areas of the two patterns irradiated by adjusting the ratio of illuminating light quantities; and processing images obtained for the corresponding areas of the two patterns and detecting a defect, wherein the step of processing the images and detecting a defect includes the sub-steps of selecting, from a plurality of image processing algorithms, an image processing algorithm corresponding to the light quantity ratio that is adjusted, employing the selected image processing algorithm to process the detected image and detect a defect, categorizing the detected defect, and displaying the categorizing results on a screen.

2. A pattern inspection method according to claim 1, wherein, at the illumination step, the ratio of light quantities to be emitted onto the sample obliquely and from above is adjusted in accordance with a sample type, a pattern density, a pattern direction and a defect type to be detected.

3. A pattern inspection method according to claim 1, wherein, at the step of selecting the image processing algorithm, the plurality of image processing algorithms are employed as a set consisting of a plurality of image comparison algorithms and a plurality of defect categorizing algorithms that correspond to the ratio of light quantities.

4. A pattern inspection method according to claim 1, wherein, at the step of processing an image using the selected image processing algorithm and detecting a defect, a plurality of images obtained at different ratios of illuminating light quantities are processed by using corresponding image processing algorithms, and obtained results are compared.

5. A pattern inspection method according to claim 1, wherein, at the illumination step, the ratio of the light quantity obliquely emitted onto the sample to the light quantity emitted from above is adjusted within the range 1:0 to 0:1.

6. A pattern inspection method according to claim 3, wherein a set consisting of the image comparison algorithm and the defect categorizing algorithm is designated on a screen.

7. A pattern inspection method comprising the steps of: irradiating corresponding areas of two identical patterns that are formed on a sample; photographing the corresponding areas of the two patterns; and comparing images obtained for the corresponding areas of the two patterns and determining an unmatched portion between the images to be a defect, wherein the step of determining an unmatched portion between the images to be a defect includes effecting adjustment so that a position shift and a brightness shift between the images for the corresponding areas of the two patterns that are compared are obtained at the same time so as to determine a defect; and wherein, at the step of determining that an unmatched portion between the images is a defect, an image processing algorithm corresponding to an adjusted ratio of quantities of light is selected from among a plurality of image processing algorithms and is employed to compare the images for the corresponding areas of the two patterns, and an unmatched portion between the images is determined as a defect.

8. A pattern inspection method according to claim 7, whereby, at the illumination step, the corresponding areas of the two patterns are irradiated by adjusting a ratio of light quantities illuminated obliquely and from above.

9. A pattern inspection apparatus comprising: a first illumination optical system for irradiating a sample in a first direction; a second illumination optical system for irradiating the sample in a second direction; an optical detection system for photogaraphing an optical image of the sample that has been irradiated by either or both of the first illumination optical system and the second illumination optical system; an image processing system selection unit for selecting one of a plurality of image processing systems that processes an image of the sample obtained by the optical detection system; an image processing unit for employing an image processing system selected by the image processing system selection unit to process the image of the sample obtained by the optical detection system and to detect a defect; a defect categorizing unit for categorizing defects detected by the image processing unit; and a display unit for employing the results categorized by the defect categorizing unit to arrange and display, or synthesize and display, the categorized defects; wherein the image processing system selection unit includes a plurality of image comparison algorithms that correspond to light quantity ratios prepared by the first illumination optical system and the second illumination optical system, and a plurality of defect categorizing algorithms that correspond to light quantity ratios prepared by the first illumination optical system and the second illumination optical systems.

10. A pattern inspection apparatus comprising: an oblique illumination optical system for obliquely illuminating a sample; a downward illumination optical system for illuminating the sample from above; a light quantity ratio adjustment unit for adjusting a ratio of light quantities for the oblique illumination optical system and the downward illumination optical system; an optical imaging unit for collecting light reflected from the sample that is illuminated by the oblique illumination optical system and the downward illumination optical system for which the light quantity ratio is adjusted by the light quantity ratio adjustment unit; a photographing unit for photographing an optical image of the reflected light that is collected by the optical imaging unit; an image processing unit for employing, from among a plurality of image processing algorithms, an image processing algorithm that corresponds to a light quantity ratio that is adjusted by a light quantity adjustment section of the illumination unit and processing an image obtained by the photographing unit, and for detecting and categorizing a defect; and a display unit for displaying results obtained by the image processing unit.

11. A pattern inspection apparatus according to claim 10, wherein the plurality of image processing algorithms of the image processing units are a plurality of image comparison processing algorithms and a plurality of defect categorizing algorithms, which correspond to the light quantity ratio for the oblique illumination optical system and the downward illumination optical system that is adjusted by the light quantity ratio adjustment unit.

12. A pattern inspection apparatus according to claim 11, wherein the image processing unit further includes: a comparator for comparing the results obtained by processing, using the image comparison algorithm and the defect categorizing algorithm, a plurality of images formed at different light quantity ratios that have been adjusted by the light quantity ratio adjustment unit for the oblique illumination optical system and the downward illumination optical system.

13. A pattern inspection apparatus according to claim 10, wherein the light quantity ratio adjustment unit adjusts the light quantity ratio for the oblique illumination section and the downward illumination section for radiation of the sample within the range 1:0 to 0:1.

14. A pattern inspection apparatus according to claim 10, further comprising: a designation unit for designating a set consisting of the image comparison algorithm and the defect categorizing algorithm for the image processing unit.

* * * * *

UNITED STATES PATENT AND TRADEMARK OFFICE
CERTIFICATE OF CORRECTION

| | | |
|---|---|---|
| PATENT NO. | : 7,620,232 B2 | Page 1 of 1 |
| APPLICATION NO. | : 11/119944 | |
| DATED | : November 17, 2009 | |
| INVENTOR(S) | : Sakai et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 974 days.

Signed and Sealed this

Twenty-sixth Day of October, 2010

David J. Kappos
*Director of the United States Patent and Trademark Office*